(12) United States Patent
Jumper et al.

(10) Patent No.: US 11,216,751 B2
(45) Date of Patent: Jan. 4, 2022

(54) INCREMENTAL TIME WINDOW PROCEDURE FOR SELECTING TRAINING SAMPLES FOR A SUPERVISED LEARNING ALGORITHM

(71) Applicant: Capital One Services, LLC, McLean, VA (US)

(72) Inventors: Daniel Jumper, Carrollton, TX (US); Jonathan Boroumand, Brooklyn, NY (US); Jeremy Gerstle, San Francisco, CA (US); Jianshi Zhao, Malvern, PA (US)

(73) Assignee: Capital One Services, LLC, McLean, VA (US)

( * ) Notice: Subject to any disclaimer, the term of this patent is extended or adjusted under 35 U.S.C. 154(b) by 52 days.

(21) Appl. No.: 16/657,450

(22) Filed: Oct. 18, 2019

(65) Prior Publication Data

US 2021/0117851 A1   Apr. 22, 2021

(51) Int. Cl.
  *G06N 20/00* (2019.01)
(52) U.S. Cl.
  CPC ............................ *G06N 20/00* (2019.01)
(58) Field of Classification Search
  CPC ................................................ G06N 20/00
  USPC .......................................................... 706/12
  See application file for complete search history.

(56) References Cited

U.S. PATENT DOCUMENTS 10,127,695 B2   11/2018   Garvey et al.
10,148,677 B2   12/2018   Muddu et al.
2007/0244741 A1   10/2007   Blume et al.
2009/0132347 A1   5/2009   Anderson et al.
2010/0280927 A1   11/2010   Faith et al.
2012/0022945 A1   1/2012   Falkenborg et al.
2013/0124258 A1   5/2013   Jamal et al.
2013/0173419 A1   7/2013   Farber et al.
2014/0032333 A1   1/2014   Hemann
2014/0046777 A1   2/2014   Markey et al.
2015/0120383 A1   4/2015   Bennah et al.
2017/0053336 A1   2/2017   Barbour et al.
2017/0236124 A1   8/2017   Wagner (Continued)

OTHER PUBLICATIONS

Raschka, "Model Evaluation, Model Selection, and Algorithm Selection in Machine Learning", 2018. (Year: 2018).*

*Primary Examiner* — Dave Misir
(74) *Attorney, Agent, or Firm* — Sterne, Kessler, Goldstein & Fox P.L.L.C.

(57) ABSTRACT

Disclosed herein are system, method, and computer program product embodiments for generating labels for training a machine learning mode using an incremental time window process. The described process may be used in a recurrence detection system. A dataset may be analyzed using incremental split dates to divide the dataset into an analysis portion and a holdout portion. The analysis portion may be analyzed to determine input features related to a predicted recurrence in the dataset. The holdout portion may be tested against the analysis portion and the input features to generate a label. The label may indicate whether or not the holdout portion confirms the prediction. The testing of the holdout portion against the analysis portion may be repeated by incrementally using different split dates and multiple separate analysis portions and holdout portions to generate multiple labels and corresponding input features.

20 Claims, 6 Drawing Sheets

(56) References Cited

U.S. PATENT DOCUMENTS

| | | | |
|---|---|---|---|
| 2018/0060744 A1* | 3/2018 | Achin | G06N 5/02 |
| 2018/0082325 A1 | 3/2018 | Kitts et al. | |
| 2018/0181895 A1* | 6/2018 | Singh | G06Q 40/12 |
| 2018/0197200 A1 | 7/2018 | Zoldi et al. | |
| 2018/0240020 A1 | 8/2018 | Madaan et al. | |
| 2018/0276541 A1 | 9/2018 | Studnitzer et al. | |
| 2018/0349790 A1* | 12/2018 | Cai | G06N 20/00 |
| 2018/0350006 A1 | 12/2018 | Agrawal et al. | |
| 2019/0073714 A1 | 3/2019 | Fidanza et al. | |
| 2019/0102276 A1 | 4/2019 | Dang et al. | |
| 2019/0108456 A1 | 4/2019 | Adjaoute | |
| 2019/0156298 A1* | 5/2019 | Ethington | G06N 20/20 |
| 2019/0287094 A1 | 9/2019 | Fisher et al. | |
| 2019/0379589 A1* | 12/2019 | Ryan | G06N 3/082 |
| 2020/0090075 A1* | 3/2020 | Achin | G06N 20/00 |
| 2020/0380335 A1 | 12/2020 | Neznal | |

* cited by examiner

INCREMENTAL TIME WINDOW PROCEDURE FOR SELECTING TRAINING SAMPLES FOR A SUPERVISED LEARNING ALGORITHM

CROSS-REFERENCE TO RELATED APPLICATIONS

This application hereby incorporates by reference for all purposes U.S. Patent Application filed under Ser. No. 16/657,382, entitled "A Technique to Aggregate Merchant level Information for Use in a Supervised Learning Model to Detect Recurring Trends in Consumer Transactions" and filed on Oct. 18, 2019; U.S. Patent Application filed under Ser. No. 16/657,394, entitled "A Method for Detecting Recurring Payments or Income in Financial Transaction Data Using Supervised Learning" and filed on Oct. 18, 2019; and U.S. Patent Application filed under Ser. No. 16/657,378, entitled "Variable Matching Criteria Defining Training Labels for Supervised Recurrence Detection" and filed on Oct. 18, 2019. The incorporated matter may be considered to further define any of the functions, methods, and systems described herein.

BACKGROUND

Traditional methods of training artificial intelligence models may lead to bias. Bias may refer to erroneously training models due to erroneous assumptions in a learning algorithm. For example, a high bias may lead to incorrect predictions from the model. Bias may occur when the some conventional methods used to train a model do not accurately detect certain patterns. These conventional methods introduce bias into the training and lead the model to miss certain patterns. This bias is particularly problematic in the realm of analyzing recurring data. For example, in transaction data that is recurring, traditional training of models may not detect irregular or complex patterns. These irregularities may include transaction data that ceases to recur, data having gap without recurrence, or changes to the recurrence after a set amount of time. By failing to recognize these types of data patterns, artificial intelligence and machine learning models may be poorly trained and incapable of detecting unique recurrence patterns.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
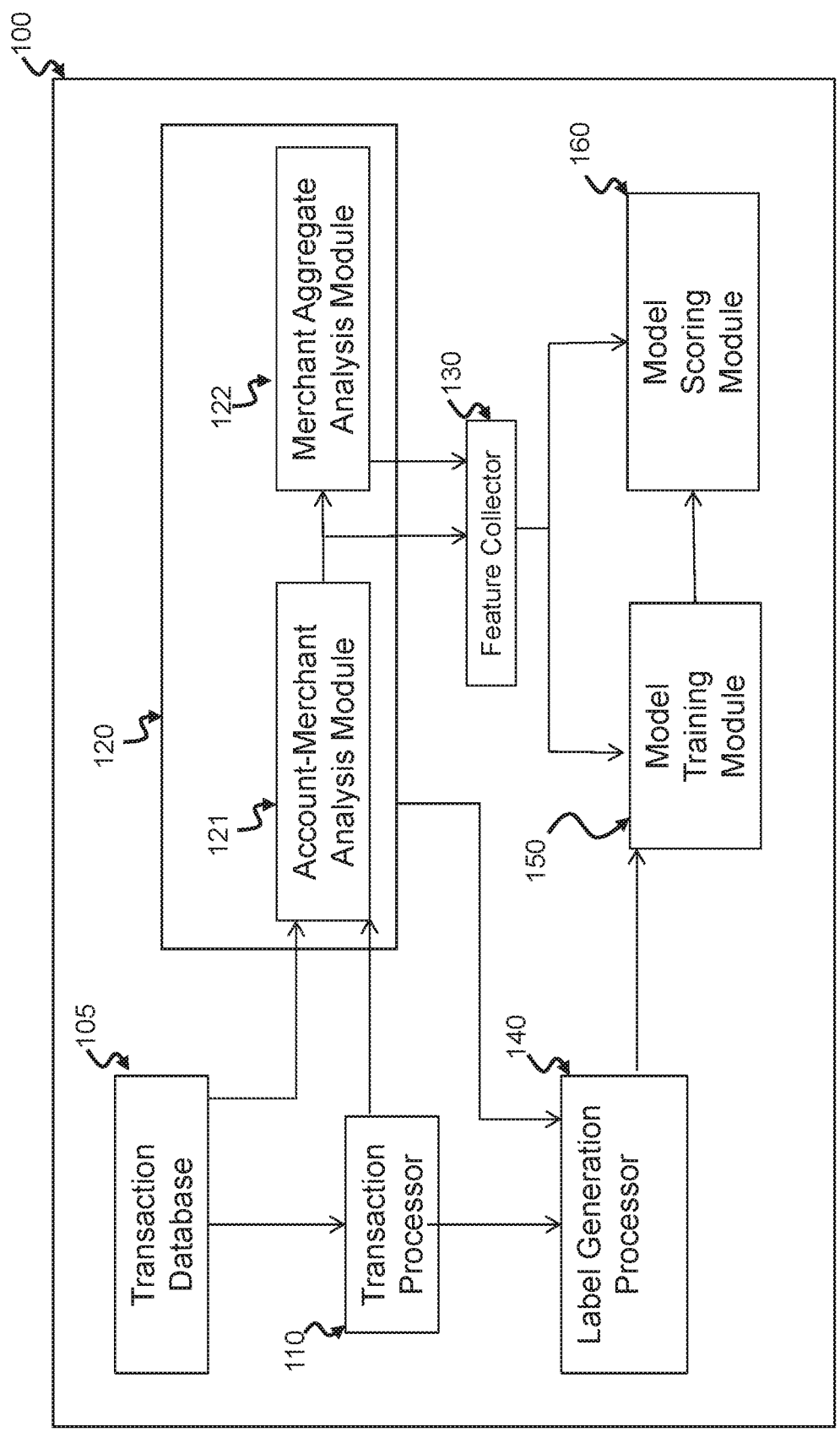
FIG. 1 depicts a block diagram of a system architecture, according to some embodiments.

Provided herein are a method, a system, and a computer program product embodiments, and/or combinations and sub-combinations thereof, for generating labels via an incremental time window. The labels may be used to train artificial intelligence and machine learning models. These models may be trained to identify recurrence within data. For example, the machine learning models may identify recurring transactions. The incremental time window method may aid in training these models to better detect irregular patterns and/or identify broader patterns from analyzed data. The incremental time window method may also avoid biases that may cause models to provide inaccurate predictions.

The Abstract section may set forth one or more but not all exemplary embodiments of the present invention as contemplated by the inventor(s), and thus, are not intended to limit the present invention and the appended claims in any way.

An objective of the present application is to provide an incremental time window method to analyze datasets and to determine labels used to train machine learning models. The incremental time window method may be applicable to different scenarios related to analyzing datasets having a sequential relationship. For example, data points within the dataset may be sequential, ranked, have timestamps, be sequenced base in time, and/or organized in other sequences. This application will describe embodiments related to data points sequenced in time, but the embodiments described may also be applicable to data organized in other sequences.

In some embodiments, the incremental time window method may analyze a dataset and generate one or more labels. These labels will be described more thoroughly below but may be used to train a machine learning model. To generate the labels, data points of the dataset may be analyzed to determine a recurrence period. The dataset may, for example, include data representing a series of transactions. The transactions may be analyzed to determine if and/or when a type of transaction recurs. For example, the dataset may represent a user's bank account or credit card. Analyzing the dataset via a cadence analysis may identify that a particular merchant periodically or semi-periodically performs a transaction for a particular amount. Similarly, other types of data and datasets may include periodicity in other ways such as a sequence. The periodicity of a dataset may indicate a recurrence period.

After the dataset is analyzed to determine a recurrence period, incremental time windows may be selected to iteratively generate labels. This process is depicted and further described with reference to FIG. 2. The incremental time windows may analyze the dataset and data points by grouping the data points into an analysis portion and a holdout portion. This grouping may be performed based on multiples of the recurrence period. For example, a first subset of the data points may be grouped into an analysis portion while a second subset of the data points may be grouped into a holdout portion. In some embodiments, the analysis portion may include the datasets falling within a first multiple of the recurrence period. The holdout portion may be the other data points of the dataset.

To train a machine learning model, the analysis portion may be used to identify input features. As will be further explained below, the input features may include data related to patterns of transactions such as $\overline{\Delta t}$ (representing an average time difference between transaction), phase variable values (such as strength, coverage, and redundancy), standard deviation values, and/or other elements. The input features may represent a prediction that a recurring transaction will occur. For example, the input features may represent a prediction that a transaction will occur in thirty days. To generate a label, the holdout portion may be tested against this prediction and the set of input features determined from the analysis portion. In an embodiment, the label may represent a Boolean value indicating whether or not the holdout portion confirmed the prediction generated from the analysis portion.

The labels may be calculated through a process of using the analysis portion to generate predictions and testing the predictions against the data held out in the holdout portion. This process of grouping a subset of the dataset into an analysis portion and another set into a holdout portion may be repeated with different split dates to generate multiple iterations with multiple labels. The pair of a label with a corresponding set of input features may be passed to a machine learning model to train the model.

In some embodiments, the splitting and grouping of the dataset may define a training sample. Different split dates may cause different sets of data to be grouped into the analysis portion or the holdout portion. In this manner, different input features and labels may be calculated via the analysis of different analysis portions and the testing of corresponding holdout portions. Different split dates may also be considered separate and independent instances or rows of training data. In this manner, multiple sets of training data may be identified even from the same dataset. A single set of transactions may result in multiple different instances of input features and corresponding labels that may represent different spans of time analyzed. These different training sets may allow for multiple labels to be used in training a model.

To generate the labels, the grouping of the dataset into an analysis portion and a holdout portion may utilize an incremental time window method. The incremental time window may determine split dates based on multiples of a recurrence period. For example, a first split date may be a time value that is one times the recurrence period or half of the recurrence period. A second split date may be a time value that is two times the recurrence period. The date may be determined from a starting date of the dataset.

A first label may be generated corresponding to the first split date. The analysis portion may include data points from a dataset having a time or sequence value between the start of the dataset and the first split date. The holdout portion may include data points having a time or sequence value after or exceeding the first split date. The analysis portion may be analyzed to determine corresponding input features. The holdout portions may be tested against the input features from the analysis portion to generate a first label corresponding to the first split date.

A second label may be generated corresponding to the second split date. As previously described, the second split date may be an incremental multiple of the recurrence period. The increment may be a subsequent multiple of the recurrence period. In this manner, the first split date may fall between a starting date of the dataset and the second split date. With the second split, the analysis portion may include data points from the data set having a time or sequence value between the start of the dataset and the second split date. This analysis portion may include the data points from the analysis portion from the first split date. The analysis portion for the second split date may then be analyzed in a manner similar to the analysis portion for the first split date to determine corresponding input features. The holdout portion for the second split date may then be tested against the corresponding input features of this analysis portion to generate a second label. Other split dates may continue to be selected to identify multiple splits and generate multiple labels. The quantity of splits and labels may depend on the length of the series of data.

These input features and labels may be used to train a machine learning model to aid in identifying patterns. For example, after training, the machine learning model may be applied to other data to generate predictions based on the training provided by the input features and labels generated during the incremental time window process. The incremental time window process may also train the model to predict irregular patterns. For example, the incremental time window process may aid in detecting scenarios where recurring transactions are canceled or paused. In an embodiment, a user may be subscribed to a particular service that generates a transaction every recurrence period. For example, the recurrence period may be monthly. In some cases, the user may cancel this service and therefore cease the recurring transaction. By using the incremental time window process, the input features and labels may be generated that indicate the former presence of a recurring transaction but then also indicate that the recurrence has ended.

Similarly, the time window process may identify pauses in recurrence. For example, a user may employ a lawn mowing service that will typically generate a monthly transaction. During the winter months, however, the lawn service may not be used, causing a pause in the transaction data. By using the incremental time window process, these pauses may be identified by generating multiple labels and sets of input features based on varying analysis data points. Similarly, a merchant may provide an introductory rate and include one or more transactions having a lower amount relative to future transactions. While the transactions may be recurring, the amounts may differ based on the introductory rate. The incremental time window process may identify input features and generate labels corresponding to this type of pattern based on the data points. Using this data, the machine learning model may better predict and categorize this type of recurrence in the data. Similarly, the machine learning model may predict that a recurring transaction may cease or when the termination will occur.

While the incremental time window process describes generating split dates, input features, and labels, the process also may use several factors to cease label generation. Ceasing label generation may include ceasing the determination of input features. In some embodiments, the incremental time window process may cease label generation when there are no longer new data points in an analysis portion to analyze. That is, ceasing label generation may occur when no new data points are identified relative to the prior split. This embodiment is further described with respect to FIG. 3. For example, as a multiples of the recurrence period are used to select incremental split dates, if a subsequent split date does not add additional data points to the analysis portion, the incremental time window process may cease label generation. This scenario may reflect the case where the data points of a dataset have been analyzed and no additional data points remain.

In some embodiments, ceasing label generation may occur with respect to a selected holdout date. For example, as an input to the incremental time window processes, a user or system may specify a particular minimum width of the holdout portion or a holdout date for testing against an analysis portion. This specified holdout portion width may be a particular amount of time and/or may be a multiple of a recurrence period. For example, a holdout portion may be specified as being at least three times the recurrence period. Specifying a holdout portion may indicate a threshold for the amount of data points desired to be tested against an analysis portion. In some embodiments, this holdout portion may be specified as a minimum amount of data points needed for testing to enable accuracy in label generation. In this manner, the specified holdout period or holdout date may cease label generation. In some embodiments, when a particular split date has exceeded and/or matched the holdout date, label generation may cease. The ceasing of label generation is further described with respect to FIG. 2.

Defining ceasing points for label generation may aid in efficiently generating labels. Further, the ceasing points may aid with accuracy when training a model. For example, by setting a holdout period or holdout date as a threshold, a system may rely on generated labels that have sufficient data points for testing. Split dates that generate labels having too few data points in the holdout portion may be discarded as being potentially inaccurate or untrustworthy. In this manner, the incremental time window process also considers when to cease the process and avoid unnecessary processing steps.

Using the incremental time window process, a larger system may identify labels and/or input features used to train a machine learning system. An example application will now be described where transaction data may be analyzed to determine cadence patterns identifying recurring data.

In accordance with some embodiments, transactions between a customer and a merchant, between two entities, or specific to a merchant will allow for predictions to be made regarding any future transaction(s) occurring on the next date(s) matching the identified cadence. Accordingly, a merchant's relationship with a customer (or customers) may be identified as recurring when a set of transactions that can be analyzed to identify a cadence, and future transaction(s) may be found occurring at the identified cadence. Based on the disclosure in this application, recurring relationship can be identified between any two entities, for example, an employer and employees, a contractor and subcontractors, etc. The disclosure does not limit its application to the customers and merchants only.

In accordance with some embodiments, a procedure to identify a recurring relationship may include: first, analyzing a set of transactions to identify a cadence within the set; second, predicting a future transaction date(s) based on the identified cadence; and third, determining if actual transactions can be found at the predicted future transaction date(s), or within a specific threshold number of days of the predicted future transaction date(s). This procedure may be applied over a large set of transactional data without waiting for actual future transactions to evaluate predictions of future transaction date(s). This can be accomplished by using historical data, i.e., transactions that have already occurred between a customer and a merchant. The historical data may be split into two portions, an analysis portion, and a corresponding holdout portion. The analysis portion may include transactions between a customer and a merchant to identify the cadence. While the holdout portion may include transactions between the customer and the merchant to test the prediction of the future transaction date(s). The transactions in the analysis portion may be transactions between the customer and the merchant occurring earlier in time than the transactions in the corresponding holdout portion. For example, the set of transactional data may represent transactions between the customer and the merchant occurring over a one-year period of time. The set of transactional data may be split into an analysis portion that includes transactions from the first eight months and the holdout portion may include transactional data for the last four months. Alternatively, transactions may be split into multiple analysis portions and holdout portions. Because the set of transactions are accumulated at different points in time, a unique merchant-account pair may uncover different pattern that each may help to generate a target label different from the others, splitting transactions into multiple analysis and holdout portion enables training of supervised learning model with more accuracy. For example, transactions between a customer and a merchant for a period starting Jan. 1, 2018 through Dec. 31, 2018 may be split into a first analysis portion that may include transactions from Jan. 1, 2018 through Apr. 30, 2018 and a corresponding holdout portion that may include transactions from May 1, 2018 through Jun. 30, 2018. And, a second analysis portion may include transactions from Jul. 1, 2018 through Oct. 31, 2018 and a corresponding holdout portion may include transactions from Nov. 1, 2018 through Dec. 31, 2018.

Based on the analysis of transactions in the analysis portion, a cadence or a recurrence period may be determined. The cadence may then be used to predict a future transaction date(s). If an actual transaction(s) matching the predicted future transaction date or the predicted future transaction dates are found in the holdout portion corresponding to the analysis portion, then a determination may be made that transactions in the analysis portion are in a recurring series, i.e., having a cadence or a recurrence period. This procedure may be used to generate target labels for training a model as discussed in detail below.

Accordingly, a set of transactions that is determined to be a recurring series is the one that will have predictable future transactions, i.e., transactions that occur at a cadence. After the set of transactions is identified as a recurring series, the set of transactions may be used as part of training a supervised learning model that may be used for more complex and accurate cadence analysis of other sets of transactions.

In accordance with some embodiments, the trained supervised learning model may not only be used for determining a cadence for predicting future transaction date(s). Rather, the supervised learning model may also determine a probability of whether a set of transactional data is one that is (or is not) likely to find a matching transaction in the future if a prediction is made based on the cadence. The cadence over which the set of transactional data may be likely recurring is based on a recurrence period, where the recurrence period may include, for example, weekly, biweekly, monthly, bimonthly, quarterly, semiannually, and/or yearly.

This procedure and its various stages are described in detail below.

Preprocessing

In accordance with some embodiments, during the preprocessing stage, raw transaction data from a set of transactional data may be preprocessed for merchant cleansing, which is described in detail below. The raw transaction data may be an initial input for training a model. The trained model may operate on sets of transactional data over time between individual account-merchant pairs. An account-merchant pair refers to a relationship between a customer and a particular merchant. The transactions in the sets of transactional data may be grouped or aggregated based on a set of columns specifying unique account-merchant pairs.

These transaction groups may then form the basis of calculating input features including account-merchant aggregate features. Input features may also be known as input variables which are used as part of training a model.

Input Feature Transformations

In accordance with some embodiments, account-merchant aggregate features include basic aggregations based on count of transactions and value aggregations based on a mean and a standard deviation of transaction amounts. Other aggregations may be based on other calculated features that characterize different aspects of the magnitude and rate of a possible recurring trend based on the time pattern of transaction dates. Examples of the other aggregations are the mean and standard deviation of the time differences between each consecutive transaction date ($\overline{\Delta t}$ and $\sigma_{\Delta t}$).

In accordance with some embodiments, the account-merchant aggregate features may be aggregated to create another set of input features known as merchant aggregate features. The merchant aggregate features may indicate transaction trends specific to each merchant. Such transaction trends include merchant level trends that can be a strong indicator of a cadence specific to a merchant and can be independent of a periodic trend in a single set of transactions. For example, when there is only one transaction between a customer and a merchant, e.g., an Internet Service Provider, it is difficult to predict the periodic trend of transactions between the customer and the merchant based on a single transaction. But based on an analysis of the cadence as determined in other sets of transactional data involving the merchant, the single transaction between the customer and the merchant could be identified as likely a recurring transaction because the transaction is with a merchant that generally has a recurring relationship with a customer. Accordingly, the merchant aggregate features may indicate the cadence or the recurrence period associated with the merchant. The merchant aggregate feature may comprise a set of variables that describe the pattern in account-merchant feature values across all accounts for the merchant.

The merchant aggregate features may depend on account-merchant features and may act as an input to a merchant-level aggregation. The merchant-level aggregation may generate metrics that may provide, for example, the percentage of accounts having a monthly recurring relationship with this merchant, etc.

Target Label Generation

Target label generation generates training labels or target labels which are used as part of training a classification model. In accordance with some embodiments, the target label generation process may start with splitting historical transactions between a customer and a merchant into an analysis portion and a holdout portion. The historical transactions are transactions that occurred between the customer and the merchant. The historical transactions may be transactions stored in a database. The account-merchant aggregate features may be computed based on transactions in the analysis portion. Subsequently, based on the account-merchant aggregate features, the recurrence period or the cadence in the transaction set may be determined. The recurrence period or cadence may then be used to predict transaction date(s) of future transaction(s). The predicted future transaction date(s) is after a chronologically last transaction date in the analysis portion. Next, transaction(s) matching the predicted future transaction date(s) is searched in the holdout portion. A target label may then be generated based on the search result. As an example, when an actual transaction with the predicted future transaction date is found in the holdout portion of transactions then transactions in the analysis portion may be labeled as transactions of a recurring series. Otherwise, the transactions may be labeled as transactions of a non-recurring series.

In accordance with some embodiments, transactions in the analysis portion may be labeled as transactions of a recurring series when a transaction(s) in the holdout portion can be found within a threshold number of days of the predicted future transaction date(s). For example, if a future transaction date is predicted in Apr. 10, 2019, and the threshold number of days is set to +/−3 days, then if a transaction with a transaction date between Apr. 7, 2019 through Apr. 13, 2019 can be found in the holdout portion, the transactions in the analysis portion may be labeled as transactions of a recurring series. Transactions in the analysis portion may be labeled as transactions of a recurring series when the prediction of future transaction dates above a specific threshold percentage comes true. By way of a non-limiting example, if the specific threshold percentage is set to 60%, then if transactions matching two of the three predicted future transactions dates are found in the holdout portion, then transactions in the analysis portion may be labeled as transactions of a recurring series. However, if only one of the three predicted future transactions dates is found in the holdout portion, then transactions in the analysis portion may not be labeled as transactions of a recurring series.

To give an example of the above-discussed procedure and its phases, for example, a merchant, which is an Internet Service Provider, would have many of its customers making payments for their subscribed services at a regular time period, for example, monthly. Based on analysis of transactions for each customer with the Internet Service Provider, as described above, by splitting transactions into an analysis portion and a holdout portion, it can be determined that 90% of the customers of the Internet Service Provider has a monthly recurring relationship with the Internet Service Provider. There may be a few customers who drop or disconnect services such that there are not enough transactions to determine a recurring relationship, or their payment history does not support a pattern for monthly recurring relationship. Accordingly, while analyzing transactions between a new customer and the Internet Service Provider, it can be predicted that there is a 90% likelihood that the the relationship of the new customer with the Internet Service Provider will be a recurring relationship at the monthly recurrence period.

Model Execution Pipelines

The flow of steps described above can be divided into three distinct "pipelines" with three distinct outputs. The three distinct model execution pipelines are a Merchant Aggregation Pipeline, a Model Training Pipeline, and a Model Scoring/Evaluation Pipeline. These pipelines are discussed in detail below.

Merchant Aggregation Pipeline

In accordance some embodiments, all three pipelines including the Merchant Aggregation Pipeline may start with determining the account-merchant features/variables. An output of the Merchant Aggregation Pipeline may be used as an input to the Model Training Pipeline and the Model Scoring/Evaluation Pipeline. The Merchant Aggregation Pipeline may determine features based on the account-merchant feature results from a complete transactional data set related to a particular account and merchant pair. Utilizing a complete transactional data set increases the accuracy of the analysis since it provides all available information associated with the merchants. In accordance with some embodiments, a subset of the complete transaction data set may be utilized such as transactions from a particular time period within the complete transactional data set. An example of the particular time period may be a more recent time period which would bias the analysis toward the more recent past. The output of the Merchant Aggregation Pipeline may be a table with a row for each merchant present in transactions and columns corresponding to various merchant aggregate features.

In accordance with some embodiments, the account-merchant input variables may be determined over two different levels of transaction aggregation. The first level of transaction aggregation may be over the set of transactions in the unique account and merchant pairs. The second level of transaction aggregation may be an aggregation of the results from the first aggregation, e.g., further aggregation at the merchant level over all accounts. In accordance with some embodiments, further aggregation at the merchant over all accounts may be based on common features among various customers, such as, geographic region, language, ethnicity, etc. Each merchant may be uniquely identified based on any combination of merchant's name; merchant's category code; merchant's postal code; merchant's country, state, and city; etc. Similarly, each customer may be uniquely identified based on the customer's account identifier; customer's first name; customer's last name; etc. Accordingly, any combination of fields uniquely identifying a customer and merchant may form a key to aggregate transactions for a unique account-merchant pair.

In accordance with some embodiments, a core set of model input features may be calculated over groups of transactions between unique account-merchant pairs. The core set of model input features may be divided into three groups: basic aggregations variables, cadence analysis variables, and the closest period variables, each of which is discussed in more detail below.

Basic Aggregation Variables

In accordance with some embodiments, input variables of a basic aggregation group may be determined based on the transactions aggregated for each unique account-merchant pair. Input variables in the basic aggregation group may include, for example, a count of the number of transactions in the transactions set (num_trxns), the number of days between the earliest and the latest transaction in the transaction set being analyzed (series_length_days), the mean of the transaction amounts (amt_mean), the standard deviation of the transaction amounts (amt_std), or the ratio of the standard deviation to the mean of the transaction amounts (amt_ratio).

In accordance with some embodiments, transactions within a certain top and bottom range such as transactions having transaction amounts within a certain threshold, e.g., 5%, of the highest and lowest transaction amounts may be discarded before aggregating. Such trimmed calculation provides for more robustness against behavior such as missed/late payments, or stray out-of-time transactions not associated with the steady recurrence. Though any of these examples may result in a small number of much larger or smaller delta t ($\Delta t$) values, which are based on the series of date differences between consecutive transactions and discussed below in detail. If the series is truly recurring aside from these aberrations, the outlier values will be ignored by these trimmed variables.

In accordance with another embodiment, the trimmed variables may not be calculated for series with a small number of $\Delta t$s because a single $\Delta t$ may represent too much of a percentage of the series to trim. Accordingly, when the transactions are trimmed, additional variables may be generated which may include, for example, the mean of the trimmed transaction amounts (trimmed_amt_mean), the standard deviation of the trimmed transaction amounts (trimmed_amt_std), and the ratio of the mean and the standard deviations of the trimmed transaction amounts (trimmed_amt_ratio).

Cadence Analysis Variables

In accordance with some embodiments, input variables of the Merchant Aggregation Pipeline may also include cadence analysis variables. The cadence analysis variables may identify a merchant's relationship with a customer as recurring and a cadence.

The cadence analysis may be performed on aggregated transactions based on a unique account and merchant pair. As discussed above, the aggregated transactions may be split into an analysis portion and a holdout portion based on different criteria as described in more detail in the related application entitled "Incremental Time Window Procedure for Selecting Training Samples for a Supervised Learning Algorithm to Identify Recurring Trends in Consumer Transaction," which is hereby incorporated by reference.

In accordance with some embodiments, the transactions in the analysis portions may be used to determine cadence analysis variables to determine the cadence present in the set of transactions. The cadence analysis variables may be either delta t ($\Delta t$) variables or phase variables characterizing cadence.

Cadence Analysis Variables: Delta ($\Delta t$) Variables

In accordance with some embodiments, delta t ($\Delta t$) variables may be determined based on the series of date differences between consecutive transactions. For example, in a series of transactions with transaction date $d_1, d_2, \ldots d_i$, $\Delta t$ may be calculated as $\Delta t=[(d_2-d_1), (d_3-d_2), \ldots (d_i-d_{i-1})])$. Other variables such as $\Delta t$ mean (mean of the $\Delta t$ series), $\Delta t$ std (standard deviation of the $\Delta t$ series), and the $\Delta t$ ratio (the ratio of $\Delta t$ std to $\Delta t$ mean) may be calculated. Transactions from the beginning and end portion of the chronologically ordered transactions of the transaction series may be trimmed or discarded to reduce the influence of statistical outliers. Accordingly, when the transactions are trimmed, trimmed delta t ($\Delta t$) variables may be calculated as trimmed $\Delta t$ mean (mean of the trimmed $\Delta t$ series), trimmed $\Delta t$ std (standard deviation of the trimmed $\Delta t$ series), and the trimmed $\Delta t$ ratio (the ratio of trimmed $\Delta t$ std to trimmed $\Delta t$ mean).

Cadence Analysis Variables: Phase Variables

In accordance with some embodiments, phase variables may be determined based on a mapping of transaction dates into phase space, which is a circular projection of a recurrence period or a billing cycle. The mapping of transactions into the phase space may be achieved by converting a transaction date of each transaction in the series of transactions into a transaction ordinal date (i.e., an integer value representing a number of days since an arbitrary "epoch" point). The phase space represents a cadence, which may also be considered a billing cycle, which may be, for example, weekly, biweekly, monthly, semi-monthly, quarterly, semi-annually, and/or yearly. Transaction ordinal dates may then be transformed into a phase angle in radians with respect to the chosen billing cycle. As the transaction ordinal dates are plotted on a circular projection representing the phase space, a tight cluster of transaction ordinal dates may indicate a close alignment of the series cadence with the chosen billing cycle or phase space. Three different phase variables may capture this qualitative indicator or alignment of the series cadence with the chosen billing cycle or phase space. These phase variables are a vector strength (or strength), a coverage, and a redundancy.

The phase variable vector strength captures how strongly clustered a set of events or transaction ordinal dates are in specific phase space or billing cycle. For example, all transaction ordinal dates of total N number of transactions may first be plotted on a unite circle projection of the chosen phase space or billing cycle. Accordingly, each transaction ordinal date will have a phase angle θ. Various coordinate points associated with the transaction ordinal dates may then be averaged to determine a mean (x, y) coordinate of all the resulting points on the unit circle of the chosen phase space. A magnitude of a vector pointing from a point (0, 0) to the mean (x, y) coordinate is the vector strength. The vector strength r may be represented as $$r = \frac{1}{N}\sqrt{\left(\sum_i \cos\theta_i\right)^2 + \left(\sum_i \sin\theta_i\right)^2},$$

where $\theta_i$ represents a phase angle of transaction i, and N represents total number of transactions. In this disclosure, the phase variable vector strength and strength may be used interchangeably.

In accordance with some embodiments, the vector strength may range in value between 0 and 1. Transactions that are perfectly recurring at the same cadence (or recurrence period) as the chosen period of the phase space projection would have a vector strength of value 1. A strongly random series of transactions, e.g., one transaction every day, would have a vector strength of value 0 when projected on to a phase space of a period larger than one week. Accordingly, a vector strength of value 1 could represent a series that has a close periodic alignment with the chosen period or billing cycle of the phase space projection, and a vector strength of value 0 could represent poor alignment with the chosen period or billing cycle, or no periodicity.

While the magnitude of the mean (x, y) vector is the vector strength, a phase angle of the mean (x, y) coordinate is a mean phase angle of the transactions in the transaction series/set. The difference between the mean phase angle of the transactions and the phase angle of the chronologically last transaction may be known as a last phase offset. The last phase offset is thus a secondary variable related to the vector strength. The last phase offset may be used to determine the closest period variable.

In accordance with some embodiments, an adjusted vector strength or scaled vector strength may also be generated. Normal vector strength calculation may result in a higher concentration of values close to 1. Because the vector strength for a pair of two vectors varies non-linearly (proportional to a cosine function) with only a small drop in strength value for changes in angle close to zero, and a large drop in value with the same change in angle at larger angles, vector strength is less sensitive to changes when the vector strength is large than when it is small. In order to increase the sensitivity in the large strength value range, the adjusted (scaled) vector strength $r_{adjusted}$ may be calculated $$r_{adjusted} = 1 - \frac{2}{\pi}\arccos(r).$$

The adjusted (scaled) vector strength $r_{adjusted}$ has a range of values between 0 and 1, but there is a lower concentration of values close to 1 because of this scaling.

The vector strength may be insensitive to projection onto a chosen phase space or billing cycle that is a multiple of the true period of the series. For example, a truly monthly recurring series could be projected onto a bimonthly, quarterly, semiannual or annual phase space and would have a perfect vector strength value of 1. In order to cover this insensitivity, a second primary phase variable called a coverage may be calculated.

In accordance with some embodiments, the coverage may be determined as a number of billing cycles in the phase projection that contains one or more transactions. In accordance with yet another embodiment, the coverage may be determined based on the percentage of billing cycles with no transactions as (1—the percentage of billing cycles with no transactions). Accordingly, the phase variable coverage may provide information to which the phase variable vector strength is insensitive.

In accordance with some embodiments, in addition to the vector strength and the coverage characterizing alignment and cases of sparse projection respectively, a third phase variable—a redundancy variable—may also be determined. The redundancy variable may provide sensitivity to dense projections or series with non-periodic noise transactions present in the transactions series. The redundancy variable may be defined as a percentage of billing cycles with more than one transaction. Collectively, the vector strength, the coverage, and the redundancy may capture a robust view of the periodicity of the series of transactions.

In the embodiments discussed above, the transaction ordinal dates are plotted on a phase space of a chosen period or a billing cycle. However, an exact recurrence period of transactions in the series may not be known in advance. Accordingly, in some embodiments, the transactions may be plotted on a phase space of not just a single period, but on a phase space of seven different periods, e.g., weekly (once every 7 days), biweekly (once every 14 days), monthly (once every month), bimonthly (once every other month), quarterly (once every third month), semiannually (once every six months), and yearly (once every year). Accordingly, the final set of phase variables may consist of all twenty-one permutations of the periods listed above, crossed with the list of three phase variables—[strength, coverage, redundancy]. Separately calculated phase variables for separate periods, for example, the phase variables for a phase space of a monthly period—a monthly strength, a monthly coverage, a monthly redundancy—may provide insight into alignment of the set of transactional data over a monthly period, whereas a weekly strength, a weekly coverage, a weekly redundancy may similarly provide insight into alignment of the transactional data over a weekly period. The resulting twenty-one phase variables and their values may be used as input in the merchant aggregation process, and in selecting the most likely period match to the series. Only the three phase variables from the closest match period may be used as an input in the final model for a given transaction series.

Accordingly, when the Internet Service Provider and its customers' transactions are analyzed using the procedure above, first transactions for each customer and the Internet Service Provider are aggregated based on the account-merchant pair. Transactions for each account-merchant pair are then split into two portions—an analysis portion and a holdout portion. Transactions in the analysis portions are then analyzed to determine the recurrence period using phase variables as described above. For each customer, the phase variables are determined for different phase spaces listed above. Accordingly, an insight into the recurrence period for each customer for the merchant may be obtained.

Closest Period Variable

In accordance with some embodiments, a closest period input variable may be structured to predict not a general "is recurring" class probability, but rather the class probability that a given series "is recurring with a specific period X." Therefore, the closest period input variable may provide an estimation of a recurrence period or a cadence that most closely aligns with a given set of transactions based on the calculated cadence analysis variables. As described above, the phase variables, e.g., the vector strength, the coverage, and the redundancy, calculated in different phase spaces each representing a different period, e.g., weekly, monthly, biweekly, bimonthly, quarterly, semiannually, and yearly, capture a view of how closely aligned a series is with that period.

A perfect recurring series will have each consecutive transaction performed after the same exact number of days. For example, a perfect recurring series having a weekly recurrence period will have each transaction performed exactly seven days after the previous transaction. Accordingly, the perfect recurring series will have the strength and the coverage with values of 1 and the redundancy with the value of 0. Accordingly, a point at coordinates (1,1,0) may represent (strength=1, coverage=1, redundancy=0), a perfect and cleanly recurring transaction series. When the phase variables for each different period are calculated, different points representing the strength, the coverage, and the redundancy in three-dimensional space may be obtained. Accordingly, when a Euclidean distance between these seven different points from the ideal point at the coordinates (1,1,0) is calculated and compared, a period having a least Euclidean distance between the point representing the phase variables (the strength, the coverage, and the redundancy) and the ideal point is the period with which the transactions series may be best aligned.

The closest period variable may be subsequently used as the basis for making future transaction predictions in the label generation process. The closest period variable may also be used to determine which phase variables will be used as an input in the final model. For example, if the Euclidean distance between the point representing a monthly strength variable, a monthly coverage variable, and a monthly redundancy variable from the ideal point (1,1,0) is the least, then the closest period's phase variables the monthly strength variable, the monthly coverage variable, and the monthly redundancy variable may be copied to new variables such as a closest strength variable, a closest coverage variable, and a closest redundancy variable. Further, the closest strength variable, the closest coverage variable, and the closest redundancy variable may be used as an input into training the model. Additionally, a time-length of the set of transactions in multiples of the period may be calculated based on the length in days of the set transactions and number of days of the period of the phase space. Thus, the closest period variable allows distinct decision boundaries on a per-period basis.

Merchant Aggregation Variables

An objective of the Merchant Aggregation Pipeline is to capture recurring trends across all accounts at the merchant level in order to calculate recurring predictions for the merchant with a higher confidence and accuracy.

In accordance some embodiments, a procedure similar to the procedure described in calculating the closest period variable, the cadence analysis phase variables and their distance from the "ideal" points may be used as the basis for aggregating information about merchants. As described above, seven separate three-dimensional phase variable spaces or points, one for each of the seven periods (weekly, monthly, biweekly, bimonthly, quarterly, semiannually, and yearly) for a separate set of these spaces for each merchant may be obtained. After the cadence analysis variables have been calculated for all transaction series, the results may be grouped by a merchant such that there will be a single set of phase variable values for each account's transactions with that merchant. Each account's phase variable values produce a single point in each of the merchant's phase variable spaces. Accordingly, for each merchant, there are seven distribution points in seven 3-dimensional spaces that together represent the merchant's relationship with all of the merchant's customers/accounts.

As described above, the Euclidean distance between the ideal point in phase variable space and the calculated point for that series represents how closely that series is aligned with that period of recurrence. Accordingly, distributions of points clustered closely around a period's ideal point, i.e., having a shortest Euclidean distance, may indicate that the merchant has a strong trend of recurring relationships with the merchant's accounts and the recurrence period. In order to quantify this, a metric that compares not just the distance between two points, but also a distance between a point and a distribution may be required.

In accordance with some embodiments, a metric to compare the ideal point to the mean point of the merchant's distribution may be generated. The metric may form first primary merchant aggregate variables: the Euclidean distance, for each period, between the ideal point and the mean of that merchant's account distribution in phase variable space. The merchant aggregate variable may be called as {period}_merch_edist and may calculate a set of seven values for each period separately. Accordingly, the closest period may be calculated as closest {period}_merch_edist point from the ideal point of (1,1,0).

Model Training Pipeline

In accordance with some embodiments, the Model Training Pipeline splits input transactions into analysis and holdout portions to determine input feature(s)/variable(s) and generates target label(s)/variable(s) to train one or more models. The Model Training Pipeline may depend on the output provided by the Merchant Aggregation Pipeline, as the merchant aggregate features may be used as input features into the Model Training Pipeline. For example, results from the cadence analysis may be used to predict transaction date(s) of future transactions, i.e., the transactions in the holdout portion.

Further, target labels may be generated based on finding a match based on the predicted transaction date(s) in the holdout portion. Generation of a target label may be dependent on finding a correct match based on tunable matching tolerance thresholds. For example, a threshold may indicate that some percentage, for example 100% or 95%, of predicted transactions are required to be found in the holdout portion. Accordingly, results of the analysis may be condensed into single binary values based on a specific matching criterion for model training, and the resulting target labels that are generated based on the specific matching criteria are used in training different models. The output of the Model Training Pipeline thus is a trained model. The process may be repeated using different matching criteria to generate any number of trained models, each one tuned to reflect the values of the respective matching criteria. Similar to Merchant Aggregation Pipeline, a complete data set, i.e., all available transactions are considered during Model Training Pipeline.

There are three parameters that specify matching criteria: date tolerance, number of predictions, and allowed misses. These criteria define labels, and because the labels are used for training models, they inherently define the trained model. As noted above, the trained model scores sets of transactions based on a likelihood that predicted transaction date(s) will find a match (as defined by our matching criteria) in future (or held-out) transactions.

In some embodiments, the date tolerance parameter is the maximum allowed difference between the predicted date and an actual held-out transaction (e.g., +/−1 day, or +/−10% of the cadence or period). As part of the analysis, the closest transaction in the held-out portion to the predicted transaction date is first identified. Then the difference is either days between the actual date of the transaction and the predicted transaction data is used directly, or divided by the average days in the cadence to produce the percentage of the period. If this calculated difference is less than or equal to the value indicated by the date tolerance parameter, then the set of transactions qualifies as having a match. When multiple predicted transaction dates are being made, this parameter may be applied separately for each predicted transaction date.

The date tolerance parameter determines the degree of inconsistency allowed between predicted transaction date(s) and actual transaction dates. It allows for the definition of what constitutes a recurrence period to be tuned between tight and loose a requirement, which subsequently affects the training of the model. For example, a value of 0 would require and exact match between the predicted transaction date and an actual transaction date in the holdout period. As another example, a value of +/−50% of the period would accept essentially any transaction in the holdout set as a match.

Another parameter used in the matching criteria is the number of predictions parameter, which indicates the number of matches that are required in the holdout period. Requiring multiple consecutive matching predictions minimizes the weakness of coincidental matches and increases the confidence in determining whether a set of transactions has a recurrence period.

Another parameter is the allowed misses parameter which allows for some misses out of multiple predictions (e.g., at least 2 out of 3 predictions). This parameter gives an added dimension of tuning—to still require a longer trend over time (reducing coincidence), but allowing inconsistencies such as missed payments.

Input transactions with the generated target labels form a training data to train a machine learning algorithm, and to generate a machine learning model. Accordingly, the generated machine learning model may make predictions on a period of recurrency of a customer with the merchant.

Model Scoring/Evaluation Pipeline

In accordance with some embodiments, the Model Scoring Pipeline, also known as a Model Evaluation Pipeline, is used to score new incoming series of transactions, once a trained model is available as an output of the Model Training Pipeline. Accordingly, the Model Scoring Pipeline depends on the Model Training Pipeline to produce a trained model object. In addition, the Model Scoring Pipeline takes as input the account-merchant features and uses the merchant aggregate results as described in the Merchant Aggregation Pipeline. The Model Scoring Pipeline may be applied to complete sets of transactional data. In yet another embodiment, the Model Scoring Pipeline may be applied to subsets of the transactional data such as when new transactions are received. For example, the Model Scoring Pipeline may score/evaluate one day's worth of new transactions, where the new transactions may cover only a small subset of unique account/merchant pairs. The full-time history of transactions is considered then only from account-merchant pairs that are found within the small subset (but not historic transactions from any other account/merchant pairs are not in the small subset). Model Scoring Pipeline may provide as output scores specifying recurring probability of the transactions of the new transactions associated with the account-merchant pairs.

In some embodiments, a trained model may score new data as follows: as new transactions are received for an account merchant pairing, the complete set of transactional data associated with that account merchant pairing are gathered and used as input for cadence analysis. In model training, cadence analysis starts by dividing a set of transactional data into analysis and holdout portions as discussed above. However, for model scoring, the set of transactional data is analyzed to produce input feature values. The merchant aggregate results—previously calculated for training—are then queried to find the values matching the merchant for the series in question. New transactions do not always immediately update the merchant aggregate results, but may be included as part of the set of transactional data on a slower periodic basis.

Various embodiments of these features will now be discussed with respect to the corresponding figures.

FIG. 1 is an illustration of system architecture, in accordance with some embodiments. A system 100 shown in FIG. 1 comprises a transaction database 105, a transaction processor 110, an account-merchant analysis module 121, a merchant aggregate analysis module 122, a feature collector 130, a label generation processor 140, a model training module 150, and a model scoring module 160. Although only one element is displayed, it is understood that each module or processor may comprise one or more modules or processors. The account-merchant analysis module 121 and the merchant aggregate analysis module 122 together form an input feature builder module 120.

In accordance with some embodiments, the transaction database 105 holds transactions executed between different customers and merchants. The transaction database 105 may organize the transactions into different sets of transactions that span a period of time. The period of time may be determined based on the purpose of the supervised model. The transaction database 105 may store transactions as raw transactions (without any preprocessing). The transaction database 105 may store the transactions after they have been preprocessed by, for example, filtering the transactions based on the account or performing a merchant name cleansing where the names of merchants are cleansed in to resolve the names of merchants.

Raw transactions in the transaction database 105 may not generally have merchant data that can be used for creating unique account-merchant pairs. This is because the merchant name may generally contain degenerates (a random sequence of characters that are appended to the raw merchant name that represent some foreign identifier). Accordingly, to identify all transactions belonging to a unique account-merchant pair, the raw transactions may be preprocessed for merchant cleansing to group transactions more consistently. In merchant cleansing, various information associated with a merchant, for example, merchant's name, merchant's category code, merchant's address information—zip code, city, state, country—may be used to retrieve a cleansed name for the merchant. Performing preprocessing, such as the cleansed merchant name, allows transactions to be grouped together accurately. Further, the transaction database 105 may be any kind of database such as Spark, Hadoop, or PostgreSQL. The database may be a memory that stores transactions.

An example of a set of transactions illustrating cleansed merchants is shown below in Table 1.

TABLE 1

| Account | Transaction Date | Transaction Amount | Merchant Name | Cleansed Merchant Name |
|---|---|---|---|---|
| 1005117177 | Apr. 4, 2016 | 9.99 | ADY* Internet Service Provider 256680048 | Internet Service Provider |
| 1005117177 | Jul. 4, 2016 | 9.99 | ADY* Internet Service Provider A1K282617 | Internet Service Provider |
| 1005117177 | Aug. 5, 2016 | 9.99 | ADY* Internet Service Provider YTWRQ8162 | Internet Service Provider |
| 1005117177 | Sep. 3, 2016 | 9.99 | ADY* Internet Service Provider 19302Q81U | Internet Service Provider |
| 1005117177 | Oct. 5, 2016 | 9.99 | ADY* Internet Service Provider QT451S896 | Internet Service Provider |
| 1005117177 | Nov. 4, 2016 | 9.99 | ADY* Internet Service Provider VTWEI7156 | Internet Service Provider |

The transaction processor 110 may process the raw transactions or transactions processed via merchant cleansing for splitting the transactions into analysis portion(s) and holdout portion(s). The transactions may span a time period, e.g., one year; the analysis portion may include transactions from subset of the time period, e.g., first 8 months, and is used to identify the cadence, and the holdout portion may include transactions from the remaining subset of the time period, e.g., the remaining 4 months, which may be used to test the predicted transaction date(s). Based on the analysis of transactions in the analysis portion, a transaction(s) occurring in future may be predicted. If an actual transaction on the predicted future transaction date is found in the holdout portion, then transactions in the analysis portion, i.e., the analysis portion, are determined to be in a recurring series. Otherwise, the transactions in the analysis portion are determined to be not in a recurring series. As described above, transactions in the analysis portion may be identified as transactions in a recurring series based on different matching criteria, such as finding transactions within a threshold number of days, e.g., +/−5 days of the predicted transaction dates, or when 80% of the predicted future transactions come true, etc.

In accordance with some embodiments, the account-merchant analysis modules 121 may receive as input either raw or preprocessed transactions from the transaction database 105. The transactions may be preprocessed transactions for merchant cleaning. The transactions received as input at the account-merchant analysis modules 121 may be transactions from the analysis portion only. The account-merchant analysis module 121 may process the received transactions for generating account-merchant input variables or account-merchant input features as part of the Merchant Aggregation Pipeline. The account-merchant input variables form a core set of model input variables determined over a group of transactions between unique account-merchant pairs. The account-merchant input variables or input features are discussed above in detail.

The account-merchant analysis module 121 may further process the aggregated transactions based on a unique account-merchant pair to generate account-merchant input features or account-merchant input variables. The account-merchant input variables form a core set of model input features. The account-merchant input features may be of three different kinds: basic aggregations variables, cadence analysis variables, and the closest period variables.

In accordance with some embodiments, the account-merchant analysis module 121 may generate or determine basic aggregation variables based on the transactions aggregated for each unique account-merchant pair. Basic aggregations variables determined by the account-merchant analysis module 121 may include, for example, the count of the number of transactions in the transactions set (num_trans), the number of days between the earliest and the latest transaction in the transaction set being analyzed (series_length_days), the mean of the transaction amounts (amt_mean), the standard deviation of the transaction amounts (amt_std), and the ratio of the standard deviation to the mean of the transaction amounts (amt_ratio).

In accordance with some embodiments, the account-merchant analysis module 121 may discard certain transactions to avoid skewing the results of the analysis. For example, the account-merchant analysis module may discard transactions having transaction amounts within 5% of the highest and lowest transaction amounts before aggregating the transactions. As described above, the purpose for this trimmed calculation is to give more robustness against messy behavior such as missed/late payments, or stray out-of-time transactions not associated with the steady recurrence. Based on analysis of the trimmed transaction, the account-merchant analysis module 121 may generate the mean of the trimmed transaction amounts (trimmed_amt_mean), the standard deviation of the trimmed transaction amounts (trimmed_amt_std), and the ratio of the standard deviation to the mean of the trimmed transaction amounts (trimmed_amt_ratio).

In accordance with some embodiments, the account-merchant analysis module 121 may generate cadence analysis variables based on an analysis of the transactions aggregated for each unique account-merchant pair. The cadence analysis variables identify whether a merchant's relationship with a customer is recurring. In cadence analysis, a set of transactions may be analyzed to identify a cadence, and future transactions may be searched occurring at the identified cadence. As described above, the cadence analysis variables are of two kinds: delta t ($\Delta t$) variables and phase variables.

In accordance with some embodiments, the account-merchant analysis module 121 may generate delta t ($\Delta t$) variables based on the series of date differences between consecutive transactions. For example, in a series of transactions with transaction date $d_1, d_2, \ldots d_i$, $\Delta t$ may be calculated as $\Delta t=[(d_2-d_1), (d_3-d_2), \ldots (d_i-d_{i-1})])$. Other variables such as the mean of the $\Delta t$ series ($\Delta t$ mean), the standard deviation of the $\Delta t$ series ($\Delta t$ std), and the ratio of the standard deviation to the mean of the $\Delta t$ series ($\Delta t$ ratio) may be determined.

In accordance with yet another embodiment, transactions from the beginning and end portion of the chronologically ordered transactions of the transaction series may be trimmed or discarded to reduce the influence of statistical outliers. Accordingly, when the transactions are trimmed, trimmed delta t ($\Delta t$) variables may be calculated as trimmed $\Delta t$ mean (mean of the trimmed $\Delta t$ series), trimmed $\Delta t$ std (standard deviation of the trimmed $\Delta t$ series), and the trimmed $\Delta t$ ratio (the ratio of trimmed $\Delta t$ std to trimmed $\Delta t$ mean).

In accordance with some embodiments, the account-merchant analysis module 121 may generate phase variables based on a mapping of transaction dates into phase space. As discussed above, these phase variables are vector strength (or strength), coverage, and redundancy.

As described earlier, the phase variable vector strength captures how strongly clustered a set of events or transaction ordinal dates are in specific phase space or billing cycle. The account-merchant analysis module 121 may chart or plot all transaction ordinal dates of total N number of transactions on a circular projection of the chosen phase space or billing cycle. Accordingly, each ordinal transaction date will have a phase angle θ. The coordinate points associated with the transaction ordinal dates are then averaged to determine a mean (x, y) coordinate of all the resulting points on the unit circle of the chosen phase space. The magnitude of a vector pointing from point (0, 0) to the mean (x, y) coordinate is the vector strength. The vector strength r may be represented as $$r = \frac{1}{N}\sqrt{\left(\sum_i \cos\theta_i\right)^2 + \left(\sum_i \sin\theta_i\right)^2},$$

where $\theta_i$ represents a phase angle of transaction i, and N represents the total number of transactions.

As described above, the vector strength ranges between 0 and 1. A series that is perfectly recurring at the same period, as the chosen period of phase space projection would have a vector strength of 1. A strongly random series of transactions, e.g., one transaction every day, would have a vector strength value of 0 when projected on to phase space of a period larger than one week. Therefore, the vector strength of value 1 represents a series that has a close periodic alignment with the chosen period or billing cycle of the phase space projection, and the vector strength of value 0 represents poor alignment with the chosen period or billing cycle or no periodicity.

As described above, a magnitude of the mean (x, y) coordinate is the vector strength; a phase angle of the mean (x, y) coordinate is a mean phase angle of the transactions. The difference between the mean phase angle of the transactions and a phase angle of a chronologically last transaction may be known as a last phase offset. The last phase offset is thus a secondary variable related to the vector strength. The last phase offset may be used to determine the closest period.

In accordance with some embodiments, the account-merchant analysis module 121 may also determine an adjusted vector strength, which may also be referred as a scaled vector strength in this disclosure. Normal vector strength calculation may result in a higher concentration of values close to 1. Because the vector strength for a pair of two vectors varies non-linearly (proportional to a cosine function) with only a small drop in strength value for changes in angle close to zero, and a large drop in value with the same change in angle at larger angles, vector strength is less sensitive to changes when the vector strength is large than when it is small. In order to increase the sensitivity in the large strength value range, the adjusted (or scaled) vector strength $r_{adjusted}$ may be calculated as $$r_{adjusted} = 1 - \frac{2}{\pi}\arccos(r).$$

The adjusted (or scaled) vector strength $r_{adjusted}$ may have a value that is between 0 and 1, with a lower concentration of values close to 1 because of this scaling.

In accordance with some embodiments, the account-merchant analysis module 121 may generate the coverage variable. The account-merchant aggregate module 121 may determine the coverage variable as a number of billing cycles in the phase projection that contains one or more transactions. In other words, the coverage may be determined based on the percentage of billing cycles with no transactions. Accordingly, the phase variable coverage may provide the information to which the phase variable vector strength is insensitive.

In accordance with some embodiments, the account-merchant analysis module 121 may generate the redundancy variable. The account-merchant analysis module 121 may determine the redundancy may be determined as the percentage of billing cycles with more than one transaction. As described above, the vector strength, the coverage, and the redundancy together may capture a robust view of the periodicity of a series of transactions and the account-merchant analysis module 121 generates these phase variables for use by other modules/components of the system 100.

In accordance with some embodiments, the account-merchant analysis module 121 may chart or plot ordinal transactions dates on different phase spaces, each phase space of the phase spaces may represent a different period. The period may include, for example, weekly (once every 7 days), biweekly (once every 14 days), monthly (once every month), bimonthly (once every other month), quarterly (once every third month), semiannually (once every six months), and yearly (once every year). Accordingly, the final set of phase variables may consist of all permutations of the different periods listed above. Separately calculated phase variables for separate periods, for example, the monthly strength, the monthly coverage, the monthly redundancy may provide insight into alignment of the series over a monthly period, whereas the weekly strength, the weekly coverage, the weekly redundancy may similarly provide insight into alignment of the series over a weekly period. The resulting phase variables and their values may be used as input in the merchant aggregation process by the merchant aggregate analysis module 122, and in selecting the most likely period match to the series. Only the three variables from the closest match period may be used as an input in the final model for a given transaction series.

In accordance with some embodiments, the account-merchant analysis module 121 may determine the closest period input variable. The account-merchant analysis module 121 may determine the closest period input variable that may be used to predict a class probability that a given series "is recurring with a specific period X." The closest period input variable may provide an estimation of what period of recurrence may be most closely aligned with a given series of transactions based on the calculated cadence analysis variables. As described above, there are three phase variables (the strength, the coverage, and the redundancy) calculated for different phase spaces each representing a different period (weekly, monthly, biweekly, bimonthly, quarterly, semiannually, and yearly) capture a view of how closely aligned a series is with that period.

As described above, a perfect and cleanly recurring series will have the strength and the coverage with values of 1 and the redundancy with a value of 0. Accordingly, a point (1,1,0) represents (strength=1, coverage=1, redundancy=0) a perfect and cleanly recurring transaction series. The account-merchant analysis module 121 may determine phase variables for each different period. Accordingly, different points representing the strength, the coverage, and the redundancy in three-dimensional space may be obtained. Next, the account-merchant analysis module 121 may compute a Euclidean distance between these different points from the ideal point (1,1,0) and may determine a period having a least Euclidean distance between the point representing phase variables (the strength, the coverage, and the redundancy) and the ideal point. The period having the least Euclidean distance between the point representing phase variables and the ideal point is the period with which the transactions series is best aligned and the period is the cadence at which the series is recurring.

The input features or input variables generated by the account-merchant analysis module 121 may act as an input to the merchant aggregate analysis module 122. The merchant aggregate analysis module 122 may process the transactions using procedures similar to described above and used by the account-merchant analysis module 121 to determine the closest period variable, the cadence analysis phase variables, and their distance from the "ideal" point. The merchant aggregate analysis module 122 may then aggregate transactions at a merchant level, i.e., transactions of all customers related to each merchant are grouped together. The transactions aggregated at the merchant level may then be processed to determine separate three-dimensional points (representing the vector strength (or strength), the coverage, and the redundancy variable), each three-dimensional point for each of the seven periods (weekly, monthly, biweekly, bimonthly, quarterly, semiannually, and yearly). After the cadence analysis variables have been calculated for all transaction series, the results may be grouped by a merchant such that there will be a single set of phase variable values for each account's transactions with that merchant. Each account's phase variable values produce a single point in each of the merchant's phase variable spaces. Accordingly, for each merchant, there are seven distribution points in seven 3-dimensional spaces that together represent the merchant's relationship with all of the merchant's customers/accounts. The process may be repeated for each merchant.

As described above, the Euclidean distance between the ideal point and the calculated/determined point for that series represents how closely that series is aligned with that recurrence period, and distributions of points clustered closely around a period's ideal point may indicate that the merchant has a strong trend of recurring relationships with the merchant's accounts. In order to quantify this, a metric that compares not just the distance between two points, but also a distance between a point and a distribution may be generated by the merchant aggregate analysis module 122.

In accordance with some embodiments, the merchant aggregate analysis module 122 may generate or determine a metric to compare the ideal point to the mean point of the merchant's distribution. The metric forms the first primary merchant aggregate variables: the Euclidean distance, for each period, between the ideal point and the mean of that merchant's account distribution in phase variable space. The merchant aggregate variable may be called as {period}_merch_edist and calculates the set of seven values for each period separately. Accordingly, the closest period may be calculated as a closest {period}_merch_edist point from the ideal point of (1,1,0). As described above, period may include, for example, weekly, biweekly, monthly, bimonthly, quarterly, semi-annually, and yearly.

The input features or input variables generated by the merchant aggregate analysis module 122 and the account-merchant analysis module may be collected by the feature collector 130 to channel as input to the model training module 150 and the model scoring module 160.

In accordance with some embodiments, the label generation processor 140 may generate labels that are used for training a classification model. Accordingly, the label generation processor 140 may also be referenced as a target label generation processor 140 in this disclosure. The labels from the label generation processor 140 may be provided as input to the training module 150. The label generation processor 140 may split the historical account-merchant groups of transactions into an analysis portion and a holdout portion. How the label generation processor 140 splits transactions directly influence the results of the analysis. If a different date boundary is used to split a set of transactions into analysis and holdout portions, different input and target variable values will be calculated. A single set of transactions may be used to generate multiple sets of transactions by virtue of selecting different split dates and each of these sets of transactions may be used to generate different labels. In other words, a single set of transactions can result in multiple different instances in the final training sample—each representing a different span of time analyzed to produce input/target variables.

As an example, a set of transactions may span a time period (e.g., a year). This set may be used to generate a first analysis portion that has a subset of that time period (e.g., two months such as January, February), a second analysis portion that another subset (e.g., three months), and a third analysis portion having another subset (e.g., four months). Consequently, the holdout portion would include transaction of the remaining subset of the time period (e.g., ten months, nine months, and eight months, respectively).

The label generation processor 140 may also compute the account-merchant aggregate features for transactions in the analysis portion. The label generation processor 140 may determine the recurrence period or the cadence that might be present in the transaction set based on the account-merchant features. The recurrence period or cadence may then be used to predict the next transaction date(s) that would take place after the transaction date of the chronologically last transaction in the analysis portion. The label generation processor 140 may determine a predicted transaction date by adding the recurrence period (e.g., a week, a month) to the transaction date of the chronologically last transaction in the set of transactions. Additional predicted transaction dates may be calculated by iteratively adding the recurrence period to the previous predicted transaction date.

Next, the label generation processor 140 may compare the predicted transaction date(s) against actual transaction date(s) of transaction(s) in the holdout portion. The target label may then be generated as a result of whether a matching transaction is found corresponding to the predicted transaction date in the holdout portion. When it is determined that a transaction exists with the predicted transaction date or within a threshold number of days of the predicted transaction date, the label generation processor 140 may label the transactions in the analysis portion as transactions in a recurring series. Otherwise, the label generation processor 140 may label the transactions in the analysis portion as transactions in a non-recurring series.

As noted above, two parameters involved in the matching criteria include date tolerance and number of predictions. The values for these parameters may be updated manually or dynamically to meet the scenarios needed. The label generation processor 140 utilizes the values for these parameters in determining whether a match exists between predicted transaction date(s) and actual date(s) of transactions within the holdout portion. Examples of the scenarios include a trained model for providing general predictions that sets of transactions are recurring and a trained model for providing prediction of transaction date(s) that is more accurate. Examples of how these parameters for matching criteria are utilized are now discussed.

As one example, the number of predictions variable may be set to "1" and a date tolerance variable may be set to "+/−3 days." At a high level, these parameters would provide loose criteria that allow some variation in matching the predicted transaction date to the actual dates while still being successful at identifying long-term trends. That is, the date tolerance variable allows an actual date to be within 3 days of the predicted transaction date and the number of predictions variable indicates only one actual transaction date needs to be matched within the holdout portion. The label generation processor 140 generates a label based on determined matches in accordance with these parameters.

Changes to the parameters affect whether a match is determined and consequently influence the labels generated by the label generation processor 140. For example, changing the number of predictions variable to "3" would require finding three actual transaction dates within the holdout portion. Requiring 3 actual transaction dates is stricter and generating labels for this criteria requires a longer hold-out time period. As another example, the date tolerance variable may be set to "+/−1 day" which also is stricter as actual transaction dates can only vary by one day from the predicted transaction date.

Labels generated by the label generation processor 140 are therefore directly impacted by these matching criteria. The reason to tune the matching criteria is to label specific types of sets of transactions as being recurring. For example, if a trained model to determine a comprehensive list of recurring relationships needs to be as inclusive as possible. Accordingly, some degree of inconsistency in a recurring series is acceptable. Adjusting the matching criteria allows the label generation processor 140 to generate labels that identify more sets of transactions as being recurring. On the other hand, as another example, a trained model for detecting a single possible "upcoming recurring charge alert" would require the label generation processor 140 to generate a label for a specific set of transactions, i.e., an alert that is very specific and accurate. For this trained model, the label generation processor 140 would require stricter matching criteria that let the trained model focus on high scores based specifically on the tight consistency of the transactions.

In accordance with some embodiments, the model training module 150 takes the target labels generated by the target label generation processor 140, input features generated by the account-merchant analysis module 121, and input features generated by the merchant aggregate analysis module 122 to train a model and to score new transactions received by the system 100. The model training module 150 may generate a trained model for each set of transactions (and its labels) that is provided by the label generation processor 140. Consequently, the model training module 150 may train multiple separate models based on the labels provided by the label generation processor 140.

In accordance with some embodiments, the model scoring module 160 may take as an input the trained model generated by the model training module 150, input features generated by the account-merchant analysis module 121 and the merchant aggregate analysis module 122, and any new incoming sets of transactions. The model scoring module 160 may score/evaluate transactions that span any period of time such as one day of new transactions. The final output of the model scoring module 160 may comprise scores specifying "recurring" probability of the transactions of the new incoming sets of transactions based on the account-merchant pairs.

Based on the description above, the transaction database 105, the account-merchant analysis module 121, and the merchant aggregate analysis module 122 may form a merchant aggregation pipeline described above. The merchant aggregation pipeline may further comprise the transaction processor 110. Similarly, the transaction database 105, the account-merchant analysis module 121, the merchant aggregate analysis module 122, the feature collector 130, the transaction processor 110, the target label generation processor 140, and the model training module 150 may form a model training pipeline described above. The transaction database 105, the account-merchant analysis module 121, the merchant aggregate analysis module 122, the feature collector 130, the transaction processor 110, the target label generation processor 140, the model training module 150, and the model scoring module 160.

The account-merchant analysis module 121, the merchant aggregate analysis module 122, the feature collector 130, the transaction processor 110, the target label generation processor 140, the model training module 150, and the model scoring module 160 may be on a single processor, a multi-core processor, different processors, FPGA, ASIC, DSP. The account-merchant analysis module 121, the merchant aggregate analysis module 122, the feature collector 130, the transaction processor 110, the target label generation processor 140, the model training module 150, and the model scoring module 160 may be implemented as a hardware module or as a software.

Figure 2:
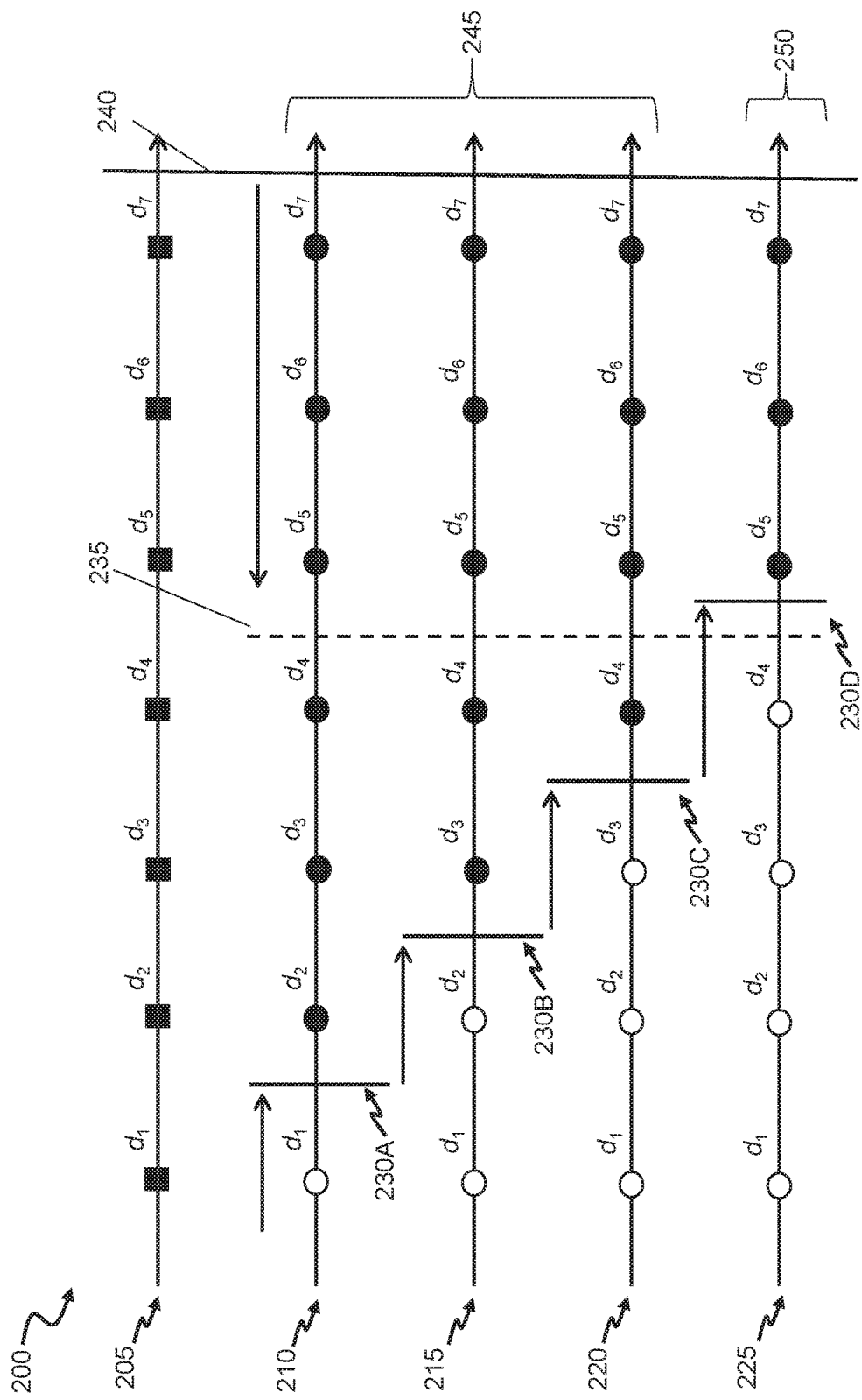
FIG. 2 depicts a block diagram of an incremental time window process, according to some embodiments.

FIG. 2 depicts a block diagram of an incremental time window process 200, according to some embodiments. In some embodiments, transaction processor 110 and/or label generation processor 140 as described with reference to FIG. 1 may execute and/or generate the incremental time window process 200. Incremental time window process 200 may generate one or more input features and/or labels used to train a machine learning model. In an embodiment, model training module 150 may utilize the input features and/or labels to train a recurrence model. This may allow model training module 150 to generate a trained model to score new transactions received by system 100.

Incremental time window process 200 may analyze dataset 205 to generate one or more input features and/or labels for training a machine learning model. Dataset 205 may include data points, such as, for example data points $d_1$ to $d_7$. In some embodiments, the data points may be sequential and/or may include a time value or timestamp corresponding to the particular data. For example, a data point may represent a transaction between a user or user account and a merchant with a corresponding timestamp. Dataset 205 may be used to generate input features and/or labels for training a model.

To analyze dataset 205, transaction processor 110 and/or label generation processor 140 may identify a recurrence period of dataset 205. In some embodiments, a recurrence period may be independently or arbitrarily set. For example, a system may be programmed to specify a recurrence period. In some embodiments, a cadence analysis may be performed to identify a recurrence period. The recurrence period may represent a repetitive characteristic of the data. In some embodiments, the recurrence period may allow for some tolerance adjustment such as "+/−3 days." To illustrate an example embodiment, a transaction may occur monthly with one or more data points of the dataset 205 indicating that the transaction has occurred. As previously described, however, the pattern may be irregular, such as, for example, identifying a ceasing or pause of a recurring transaction. Other data, such as data from an account-merchant analysis module 121 and/or merchant aggregate analysis module 122, may also provide data used to predict the recurrence period.

In some embodiments, the predicted recurrence period may be used to identify split dates 230. Each split date 230 scenario, or "split," may be analyzed to identify input features and/or corresponding labels to be used to train a machine learning model. The input features may include data related to patterns of transactions such as $\overline{\Delta t}$ (representing an average time difference between transaction), phase variable values (such as strength, coverage, and redundancy), standard deviation values, and/or other elements. The input features may represent a prediction that a recurring transaction will occur. For example, the input features may represent a prediction that a transaction will occur in thirty days. To generate a label, the holdout portion may be tested against this prediction and the set of input features determined from the analysis portion. In an embodiment, the label may represent a Boolean value indicating whether or not the holdout portion confirmed the prediction generated from the analysis portion.

Split dates 230 may be determined based on multiples of the recurrence period. Each split date 230 may divide the dataset 205 into an analysis portion and a holdout portion. As the split date is incremented, for example from split date 230A to 230B, the analysis portion may increase in the number of data points while the holdout portion may decrease.

In some embodiments, split 210 may be generated from split date 230A. Split date 230A may be determined from a multiple of the recurrence period. From a starting point such as a starting date or the first data point, split date 230A may be calculated as a multiple of the recurrence period from the initiate starting point. In an embodiment, split date 230A may fall between data points $d_1$ and $d_2$. Split 210 may represent a first analysis scenario having an analysis portion and a holdout portion based on split date 230A. In particular, the analysis portion may include data points occurring earlier in the sequence and before split date 230A (e.g., data point $d_1$) while the holdout portion may include data points occurring later in the sequence and after split date 230A (e.g., data points $d_2$ through $d_7$). To generate a label, the holdout portion may be tested against the analysis portion and corresponding input features of the analysis portion. In this manner a label for split 210 may be generated.

To illustrate an example embodiment, dataset 205 may include transaction data related to a user account performing a recurring transactions with a merchant. The recurrence period may be predicted as monthly. Split 210 may group data points falling within the split date 230A of one month into the analysis portions while other data points may be grouped into the holdout portion.

In the incremental time window process, another label maybe generated for another split 215 based on split date 230B. Split date 230B may be another multiple of the recurrence period. In some embodiments, split date 230B may be a subsequent and/or incremental multiple of the recurrence period. For example, if split date 230A was determined as one times the recurrence period, split date 230B may be determined from two times the recurrence period. Similarly, split date 230C may be three times the recurrence period. To continue with the example embodiment described above, split date 230B may be two months from the initial starting point while split date 230C may be three months from the initial starting point.

Split 215 may group the data points of dataset 205 into an analysis portion and a holdout portion based on split date 230B. The analysis portion may include data points $d_1$ and $d_2$ while the holdout portion may include data points $d_3$ through $d_7$. Similar to split 210, split 215 may generate a label by testing the holdout portion against the input features from the analysis portion. With a different analysis portion and different holdout portion, the label generated from split 215 may provide additional insight and/or analysis of the dataset 205 relative to the label generated at split 210. By using these multiple labels to train a machine learning model, the model may more accurately and/or more robustly identify patterns when analyzing additional data. For example, some methods may select a fixed endpoint for a holdout portion using a fixed period of time from the end of a series. This approach, however, may include a bias against detecting irregular patterns such as a pause in the recurrence or termination of the recurrence. By generating and using multiple labels and/or input features, additional data is provided to train the models to better identify irregular patterns.

The incremental time window process may continue by generating split 220 with split date 230C and/or split 225 with split date 230D. Split 220 may be used to generate another label based on a testing of a holdout section including data points $d_4$ through $d_7$ against an analysis portion including data points $d_1$ through $d_3$.

While the incremental time window process may be applied to each of the data points with multiple split dates 230, some conditions may be utilized to cease label generation. Ceasing label generation may avoid wasteful iterations or splits that may yield inaccurate labels. To maintain accuracy, a holdout date 235 may be specified to set a quantity of data points for the holdout portion. In some embodiments, the holdout date 235 may represent a minimum amount of holdout data that should exist in a particular split for the label to be accepted and used for model training. A holdout date 235 may be a set value and/or may be a particular multiple of the recurrence period counted back from an endpoint 240 or last data point of dataset 205. In view of the holdout date 235, the incremental time window process may cease when a split date 230 exceeds the holdout date 235.

For dataset 205, the holdout date 235 may be between data points $d_4$ and $d_5$. For example, the system may have specified a holdout date 235 as a multiple of the recurrence period counted back from endpoint 240. For example, holdout date 235 may be three times the multiple of the recurrence period counted back from endpoint 240, causing the holdout date 235 to be set between data points $d_4$ and $d_5$. The determination of holdout date 235 may be performed prior to the generation of splits 205-225.

In some embodiments, when each split date 230 is determined, the determined split date 230 may be compared to holdout date 235. When a particular split date 230 exceeds holdout date 235, the corresponding split may be discarded or rejected as not having a sufficient holdout portion. For example, split 225 may include split date 230D which exceeds holdout date 235. In this manner, split 225 may be deemed a discarded split 250. A discarded split 250 may not undergo the testing of a holdout portion against the analysis portion. By avoiding this attempt, computing resources may be saved in view of the insufficient amount of data specified by the holdout date 235.

In contrast to discarded split 250, accepted splits 245 which may include splits 210, 215, and 220 may undergo testing of the holdout portion against the analysis portion to generate corresponding labels. In this manner, incremental time window process 200 may produce three labels corresponding to dataset 205. Further, incremental time window process 200 may produce these three labels (and corresponding input features) without generating unaccepted labels having insufficient holdout testing data. This procedure may allow for faster computing and generation of labels by identifying a particular condition for ending the process.

While incremental time window process 200 has been described with time values such as dates and timestamps, incremental time window process 200 may also be applied to other forms of sequential data. For example, dataset 205 may be ordered in a particular sequence. The generation of splits and/or split dates 230 may also be applied to the sequential data based on a number or recurring sequence. The labels may be generated in a similar manner as well.

Figure 3:
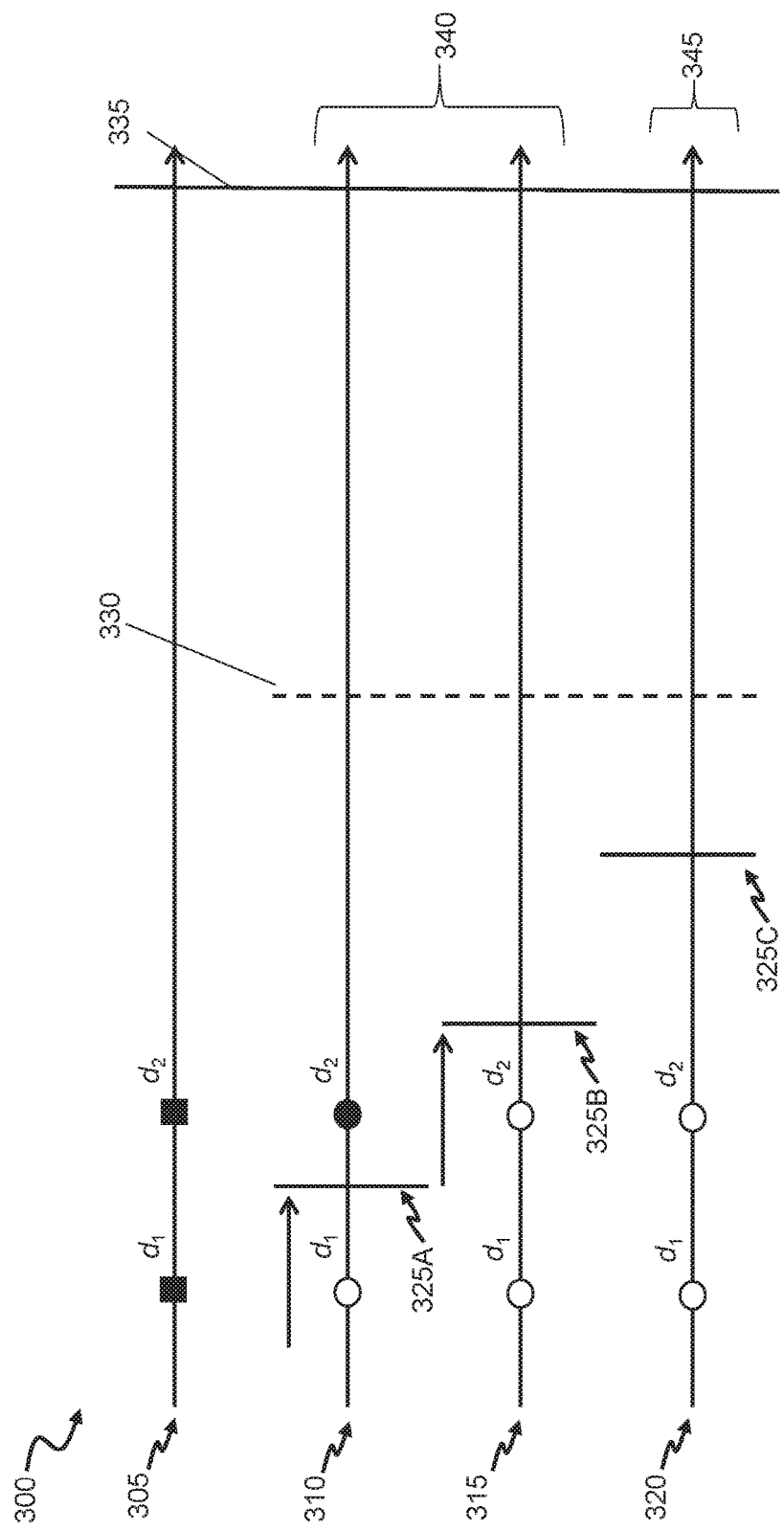
FIG. 3 depicts a block diagram of a label generation ceasing process, according to some embodiments.

FIG. 3 depicts a block diagram of a label generation ceasing process 300, according to some embodiments. In some embodiments, transaction processor 110 and/or label generation processor 140 as described with reference to FIG. 1 may execute the label generation ceasing process 300 to end the incremental time window process 200 as described with reference to FIG. 2. Label generation ceasing process 300 may terminate incremental time window process 200 when an amount of data in the analysis portion is exhausted. In response to ceasing label generation, the acceptable labels may be used to train a machine learning model.

Label generation ceasing process 300 may operate in a similar manner to incremental time window process 200 as described with reference to FIG. 2. For example, dataset 305 may be analyzed to identify labels for training a machine learning model. Dataset 305 may include data points $d_1$ and $d_2$. Dataset 305 may be analyzed to determine a recurrence period. A first split 310 may be generated by identifying a first multiple of the recurrence period to determine a split date 325A. Split date 325A may be used to group data point $d_1$ into the analysis portion while grouping data point $d_2$ into a holdout portion. The holdout portion may be tested against the analysis portion to generate a label for split 310.

This process may also occur for split 315. Split date 325B may be incrementally determined relative to split date 325A as a multiple of the recurrence period. In some embodiments, split date 325B may group data points in a manner where no data points are grouped into the holdout portion. For example, data points $d_1$ and $d_2$ may be grouped into the analysis portion. In some embodiments, this split 315 may still be used to generate a label and/or input features for training the machine learning model even without the testing of a holdout portion.

While no subsequent data points may exist, split date 325B has not reached holdout date 330. In this scenario, label generation ceasing process 300 may continue to identify a next multiple of the recurrence period to attempt to generate another label. Split date 325C may be identified corresponding to split 320. In this scenario, label generation ceasing process 300 may identify that no data points exist between split date 325B and split date 325C. This scenario may indicate that the dataset has been exhausted even if a split date 325 has not reached a holdout date 330 calculated from an endpoint 335. Holdout date 330 may be a date specified for ceasing analysis. In response to identifying that no data points exist between two split dates 325, however, label generation ceasing process 300 may terminate the analysis of analysis portions and the creation of new labels. In this manner, the accepted splits 340 may include splits 310 and 315 while the discarded splits 345 may include split 320. The input features and/or labels generated from the discarded splits 345 may not be used to train the machine learning model.

The ceasing of label generation may aid in avoiding wasteful computing resources that would analyze data points and provide inaccuracies for training the machine learning algorithm. By employing a condition to cease label generation, the identification of training labels may be performed in a more efficient manner.

Figure 4:
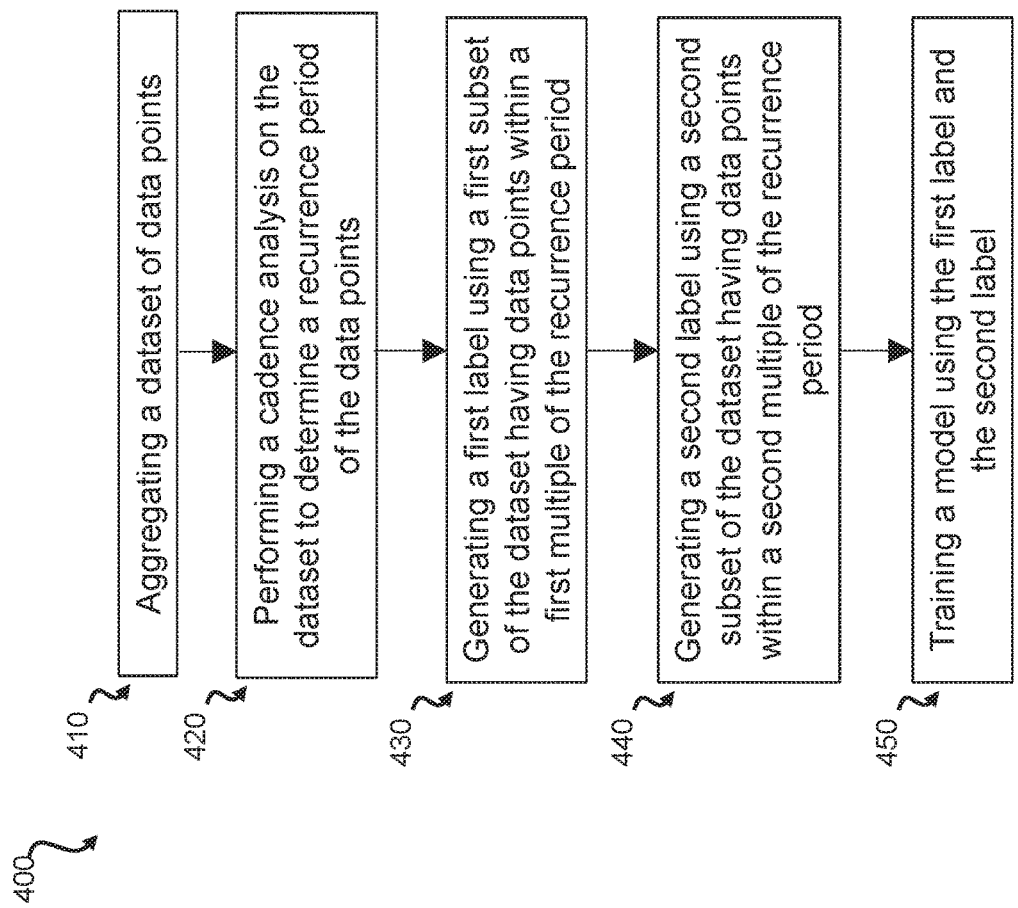
FIG. 4 depicts a flow diagram of an example method for generating multiple labels, according to some embodiments.

FIG. 4 depicts a flow diagram of an example method 400 for generating multiple labels, according to some embodiments. As a non-limiting example with regards to FIG. 1, one or more processes described with respect to FIG. 4 may be performed by a training system (e.g., the training system 100 of FIG. 1) for generating training labels based on sets of transactions and matching criteria where the labels are subsequently used as part of training a model to create a trained model. In such an embodiment, system 100 may execute code in memory to perform certain steps of method 400 of FIG. 4. While method 400 will be discussed below as being performed by certain components of the system 100 such as the transaction processor 110 and/or the label generation processor 140, other devices including may store the code and therefore may execute method 400 by directly executing the code. Further, while method 400 describes the generation of a first label and a second label, method 400 may be used to generate any number of labels and many additional labels could be generated depending on the analyzed dataset and data points. Accordingly, the following discussion of method 400 will refer to components of FIG. 1 as an exemplary non-limiting embodiment of method 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

At 410, the transaction processor 110 may aggregate a dataset of data points. In an embodiment, this may include collecting transaction data from the transaction database 105. Transactions may be preprocessed such as filtering, merchant name cleansing, and aggregating transactions based on specific parameters including account-merchant pairing or by cleansed merchant name. In some embodiments, the transaction processor 110 preprocesses the transactions received from the transaction database 105. In other embodiments, the transaction processor 110 receives transactions that have already been preprocessed by the transaction database 105 or some other component of the system 100.

In some embodiments, transactions are grouped into different sets of transactions. These sets of transactions may be grouped based on different criteria. As one example, one set of transactions may represent the transactions between an account (e.g., a customer) and a merchant for a specific time period (e.g., a year). As another example, another set of transactions may represent transactions between a plurality of accounts (e.g., multiple customers) and a single merchant for a specific time period. Accordingly, transactions may be organized into multiple sets of transactions that may be utilized by the transaction processor 110. So while this disclosure discusses the transaction processor 110 performing operations on a set of transactions, it is within the scope of this disclosure that the transaction processor 110 may perform such operations on multiple sets of transactions.

At 420, the transaction processor 110 may then perform a cadence analysis on the dataset to determine a recurrence period of the data points. The recurrence period may be identified based on an analysis of the dataset and/or based on external data related to the dataset. For example, external data may indicate that a merchant performs a transaction monthly while a different merchant performs a transaction quarterly. This recurrence period may also include a tolerance such as a number of days. In some embodiments, transaction processor 110 may perform a prediction based on the dataset to determine a predicted recurrence period. This prediction may occur based on a recurrence period that would generate the closest to ideal phase variables.

At 430, transaction processor 110 and/or label generation processor 140 may generate a first label using a first subset of the dataset having data points within a first multiple of the recurrence period. For example, the first label may be generated using a first split date determined via a first multiple of the recurrence period. The split date may split the dataset into an analysis portion and a holdout portion. The analysis portion may include the first subset of the dataset having data points within the first multiple of the recurrence period. The analysis portion may then be analyzed to determine a first set of input features. The label may be generated by testing the holdout portion against the first set of input features from the analysis portion. As previously described, the label may indicate whether or not the data points of the holdout portion confirm a predicted recurrence from the analysis portion.

At 440, transaction processor 110 and/or label generation processor 140 may generate a second label using a second subset of the dataset having data points within a second multiple of the recurrence period. For example, the second label may be generated using a second split date determined via a second multiple of the recurrence period. The second split date may split the dataset into a second analysis portion and holdout portion. The analysis portion may include the second subset of the dataset having data points within the second multiple of the recurrence period. The analysis portion may then be analyzed to determine a second set of input features. The label may be generated by testing the holdout portion against the second set of input features from the analysis portion. The label may indicate whether or not the data points of the holdout portion confirm a predicted recurrence from the analysis portion.

In some embodiments, the second subset of the dataset may include the data points of the first subset of the dataset. The second split date may be incrementally selected as a subsequent multiple of the recurrence period relative to the first split date. In this manner, the split dates may generate incremental time windows for testing different analysis portions against corresponding holdout portions.

At 450, transaction processor 110 and/or label generation processor 140 may pass the labels to model training module 150 to train a model using the first label and the second label. In some embodiments, the corresponding input features may also be passed to the model training module 150. The input features may reflect predictions based on analyzed splits while the labels may indicate whether the prediction from the input features is confirmed. Generating multiple sets of input features and corresponding labels may aid in training the machine learning model to better categorize future data and/or identify irregular patterns.

Figure 5:
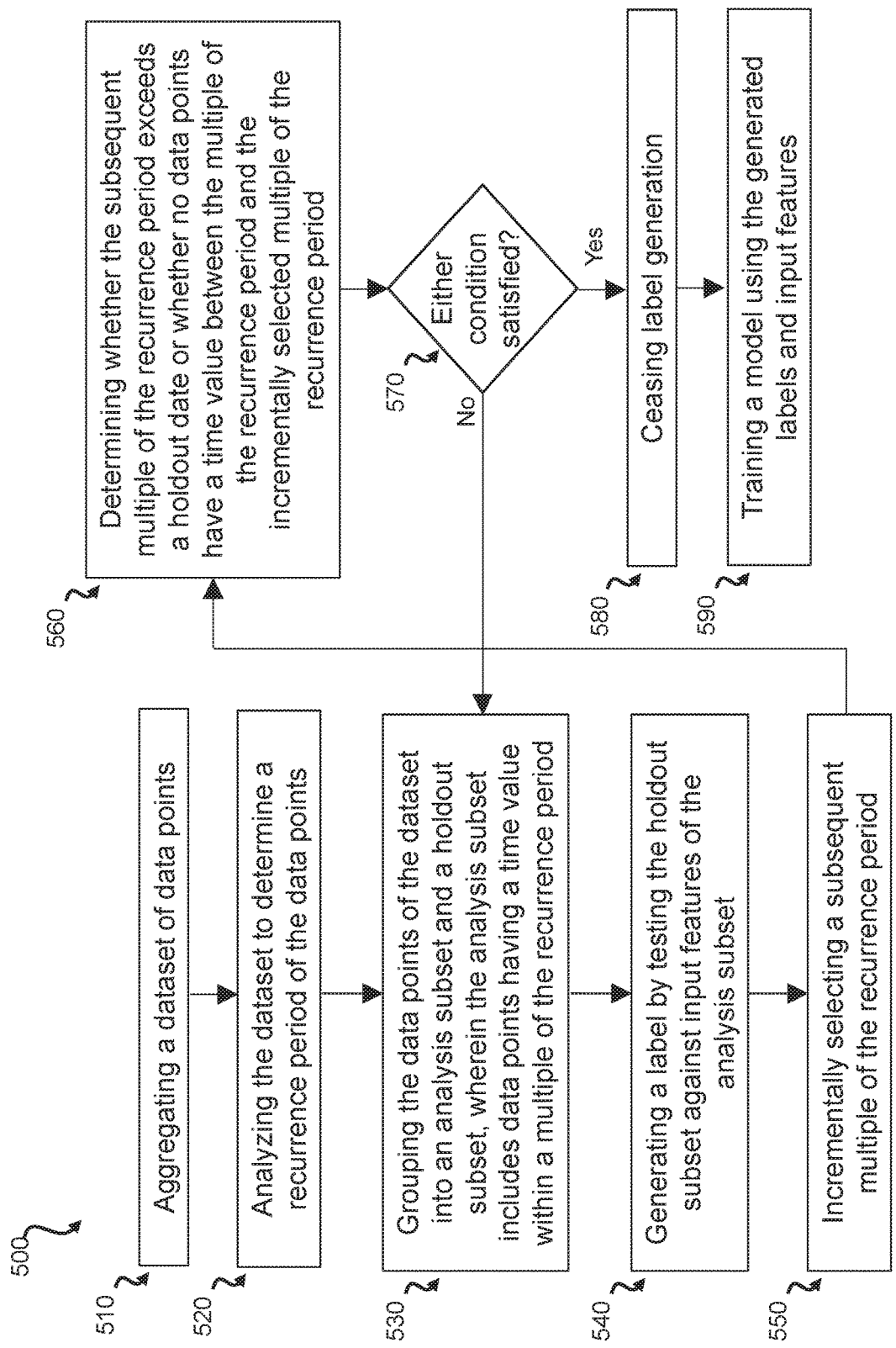
FIG. 5 depicts a flow diagram of an example method for incrementally analyzing time windows, according to some embodiments.

FIG. 5 depicts a flow diagram of an example method 500 for incrementally analyzing time windows, according to some embodiments. As a non-limiting example with regards to FIG. 1, one or more processes described with respect to FIG. 5 may be performed by a training system (e.g., the training system 100 of FIG. 1) for generating training labels based on sets of transactions and matching criteria where the labels are subsequently used as part of training a model to create a trained model. In such an embodiment, system 100 may execute code in memory to perform certain steps of method 500 of FIG. 5. While method 500 will be discussed below as being performed by certain components of the system 100 such as the transaction processor 110 and the label generation processor 140, other devices including may store the code and therefore may execute method 500 by directly executing the code. Accordingly, the following discussion of method 500 will refer to components of FIG. 1 as an exemplary non-limiting embodiment of method 500. Moreover, it is to be appreciated that not all steps may be needed to perform the disclosure provided herein. Further, some of the steps may be performed simultaneously or in a different order than shown in FIG. 5, as will be understood by a person of ordinary skill in the art.

At 510, the transaction processor 110 may aggregate a dataset of data points. In an embodiment, this may include collecting transaction data from the transaction database 105. Transactions may be preprocessed such as filtering, merchant name cleansing, and aggregating transactions based on specific parameters including account-merchant pairing or by cleansed merchant name. In some embodiments, the transaction processor 110 preprocesses the transactions received from the transaction database 105. In other embodiments, the transaction processor 110 receives transactions that have already been preprocessed by the transaction database 105 or some other component of the system 100.

In some embodiments, transactions are grouped into different sets of transactions. These sets of transactions be grouped based on different criteria. As one example, one set of transactions may represent the transactions between an account (e.g., a customer) and a merchant for a specific time period (e.g., a year). As another example, another set of transactions may represent transactions between a plurality of accounts (e.g., multiple customers) and a single merchant for a specific time period. Accordingly, transactions may be organized into multiple sets of transactions that may be utilized by the transaction processor 110. So while this disclosure discusses the transaction processor 110 performing operations on a set of transactions, it is within the scope of this disclosure that the transaction processor 110 may perform such operations on multiple sets of transactions.

At 520, the transaction processor 110 may then perform a cadence analysis on the dataset to determine a recurrence period of the data points. The recurrence period may be identified based on an analysis of the dataset and/or based on external data related to the dataset. For example, external data may indicate that a merchant performs a transaction monthly while a different merchant performs a transaction quarterly. This recurrence period may also include a tolerance such as a number of days. In some embodiments, transaction processor 110 may perform a prediction based on the dataset to determine a predicted recurrence period. This prediction may occur based on a recurrence period that would generate the closest to ideal phase variables.

At 530, the transaction processor 110 may group the data points of the dataset into an analysis subset and a holdout subset, wherein the analysis subset includes data points having a time value within a multiple of the recurrence period. As will be further described, 530 may be performed iteratively to perform the incremental time window process 200 as described with reference to FIG. 2. Having determined a multiple of the recurrence period, a split may be generated grouping the data points based on a corresponding split date. The data points having a time value before the split date may be grouped into the analysis subset while the data points having a time value after the split date may be grouped into the holdout subset.

At 540, the transaction processor 110 and/or label generation processor 140 may generate a label by testing the holdout subset against input features of the analysis subset. As previously described, the input features may represent a prediction based on the analysis subset. The input features may include values such as data related to patterns of transactions such as $\overline{\Delta t}$ (representing an average time difference between transaction), phase variable values (such as strength, coverage, and redundancy), standard deviation values, and/or other elements. The data points of the holdout subset may be tested against these input features to generate a label. The label may be a Boolean value indicating whether or not the holdout portion confirmed the prediction generated from the analysis portion.

At 550, transaction processor 110 may incrementally select a subsequent multiple of the recurrence period. This selection may represent the incremental time window process of generating new splits based on new split dates. The subsequent multiple of the recurrence period may be used to determine a second split date. The second split date may be determined by adding the subsequent multiple of the recurrence period to the starting entry or time of the dataset.

At 560, transaction processor 110 may determine whether the subsequent multiple of the recurrence period exceeds a holdout date or whether no data points have a time value between the multiple of the recurrence period and the incrementally selected multiple of the recurrence period. At 570, transaction processor 110 may determine if either condition is satisfied. These conditions may represent conditions ceasing label generation at 580. In some embodiments, one of the conditions or both of the conditions may be implemented to cease label generation. While FIG. 5 depicts this process as after an initial grouping of the data points at 530, in some embodiments, an initial check of whether an end condition is satisfied may be performed prior to 530.

To further describe the conditions, if a subsequent multiple of the recurrence period causes a split date to exceed a set holdout date, label generation may cease. This scenario may indicate that an insufficient amount of holdout data points exist for testing against the input features of the analysis portion. Similarly, label generation may cease when no data points have a time value between the multiple of the recurrence period and the incrementally selected multiple of the recurrence period. This scenario may indicate that the analysis portion is no longer growing or adding data points. In this scenario, label generation may also cease.

At 590, transaction processor 110 and/or label generation processor 140 may train a model using the generated labels and input features. The input features may be paired with the generated labels to train a machine learning model used to predict transactions that may be recurring.

Returning to 570, if neither condition is satisfied, method 500 may return to 530 using the subsequent multiple of the recurrence period. The subsequent multiple of the recurrence period may then be used to group the data points into an analysis subset and a holdout subset. This process may represent an incremental time window for generating new input features and/or labels used for training a machine learning model. The method 500 may continue and incremental select additional multiples of the recurrence period until an end condition is satisfied.

Figure 6:
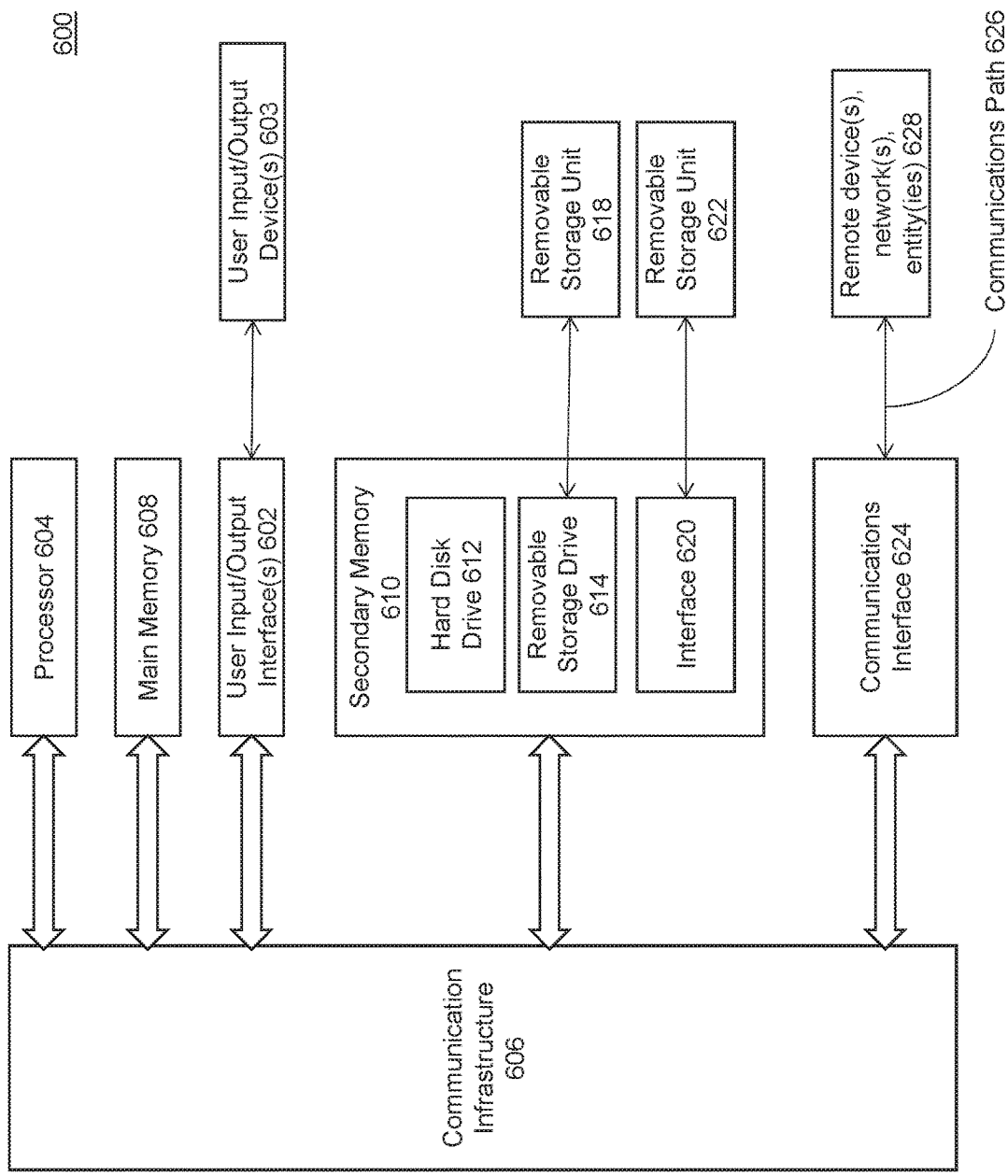
FIG. 6 depicts an example computer system useful for implementing various embodiments.

FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:
1. A computer-implemented method, comprising:
aggregating a dataset of data points;
performing a cadence analysis on the dataset to determine a recurrence period of the data points;

generating a first label using a first subset of the dataset having data points within a first multiple of the recurrence period;
generating a second label using a second subset of the dataset having a number of data points within a second multiple of the recurrence period, wherein the second subset includes the number of data points from the first subset within the first multiple of the recurrence period, and wherein the number of data points is based on a matching criteria that comprises a number of predictions and a date tolerance, and wherein the number of data points within the second multiple of the recurrence period are within the date tolerance and are equal to the number of predictions;
training a machine learning model using the first label and the second label;
receiving a set of transactions associated with an account and a merchant; and
generating, by the trained machine learning model, a predicted recurrence within the set of transactions, wherein generating the predicted recurrence further comprises:
determining a vector strength, a coverage, and a redundancy, wherein the vector strength, the coverage, and the redundancy are phase variables determined based on a mapping of transaction dates in a phase space associated with the set of transactions and characterizing a recurrence period within the set of transactions, and wherein the vector strength includes a first value reflecting a level of recurrence of the set of transactions within the recurrence period, the coverage includes a second value reflecting a number of recurrence periods that include no transactions from the set of transactions, and the redundancy includes a third value reflecting a number of recurrence periods that include at least one transaction from the set of transactions, wherein the set of transactions are plotted on the phase space for multiple recurrence periods with associated phase variables for each of the multiple recurrence periods and wherein the multiple recurrence periods includes the recurrence period; and
generating a probability of the merchant having the predicted recurrence within the set of transactions for the account, for the recurrence period, using the trained machine learning model based on an evaluation of at least one of the first value, the second value and the third value.

2. The computer-implemented method of claim 1, wherein generating the first label further comprises:
designating the first subset as an analysis portion;
designating the data points having a time value exceeding the first multiple of the recurrence period as a holdout portion; and
testing the holdout portion against the analysis portion to generate the first label.

3. The computer-implemented method of claim 2, further comprising: identifying a holdout multiple of the recurrence period; and
determining a delta between the holdout multiple and a data point of the dataset having a most recent time value to generate a holdout date.

4. The computer-implemented method of claim 3, further comprising:
determining that a third multiple of the recurrence period exceeds the holdout date; and
in response to the determining, ceasing label generation.

5. The computer-implemented method of claim 1, wherein the second multiple of the recurrence period is incrementally selected relative to the first multiple of the recurrence period.

6. The computer-implemented method of claim 1, further comprising:
ceasing label generation in response to determining that no data points of the dataset have a time value between the second multiple of the recurrence period and a subsequent multiple of the recurrence period.

7. The computer-implemented method of claim 1, further comprising:
generating a third label using a third subset of the data having data points within a third multiple of the recurrence period, wherein the third subset includes the data points from the first subset and the data points from the second subset.

8. A system, comprising:
a memory; and
at least one processor coupled to the memory and configured to:
aggregate a dataset of data points;
analyze the dataset to determine a recurrence period of the data points;
group the data points of the dataset into a first analysis subset and a first holdout subset, wherein the first analysis subset includes data points having a time value within the recurrence period;
generate a first label by testing the first holdout subset against the first analysis subset;
group the data points of the dataset into a second analysis subset and a second holdout subset, wherein the second analysis subset includes first data points from the first analysis subset and second data points having a time value within a multiple of the recurrence period, wherein the data points is based on a matching criteria that comprises a number of predictions and a date tolerance, and wherein the data points within the second analysis subset are within the date tolerance and are equal to the number of predictions;
generate a second label by testing the second holdout subset against the second analysis subset;
train a machine learning model using the first label and the second label;
receive a set of transactions associated with an account and a merchant; and
generate, by the trained machine learning model, a predicted recurrence within the set of transactions, wherein to generate the predicted recurrence further comprises:
determining a vector strength, a coverage, and a redundancy, wherein the vector strength, the coverage, and the redundancy are phase variables determined based on a mapping of transaction dates in a phase space associated with the set of transactions and characterizing a recurrence period within the set of transactions, and wherein the vector strength includes a first value reflecting a level of recurrence of the set of transactions within the recurrence period, the coverage includes a second value reflecting a number of recurrence periods that include no transactions from the set of transactions, and the redundancy includes a third value reflecting a number of recurrence periods that include at least one transaction from the set of transactions, wherein the set of transactions are plotted on the phase space for multiple recurrence periods with associated phase variables for each of the multiple recurrence periods and wherein the multiple recurrence periods includes the recurrence period; and generating a probability of the merchant having the predicted recurrence within the set of transactions for the account, for the recurrence period, using the trained machine learning model based on an evaluation of at least one of the first value, the second value and the third value.

9. The system of claim 8, wherein the difference in data points between the second analysis subset and the first analysis subset is the difference in data points between the first holdout subset and the second holdout subset.

10. The system of claim 8, wherein the at least one processor is further configured to:

cease label generation in response to determining that no data points of the dataset have a time value between the multiple of the recurrence period and a subsequent multiple of the recurrence period.

11. The system of claim 8, wherein the multiple of the recurrence period is incrementally selected relative to the recurrence period.

12. The system of claim 9, wherein to generate the first label, the at least one processor is further configured to:

identify a second multiple of the recurrence period; and
determine a delta between the second multiple and a data point of the dataset having a most recent time value to generate a holdout date.

13. The system of claim 12, wherein the at least one processor is further configured to:

determine that a third multiple of the recurrence period exceeds the holdout date; and
in response to the determining, ceasing label generation.

14. A non-transitory computer-readable device having instructions stored thereon that, when executed by at least one computing device, cause the at least one computing device to perform operations comprising:

aggregating a dataset of data points, wherein the data points include corresponding time values;
determining a recurrence period of the data points based on the corresponding time values;
generating a first label using a first subset of the dataset having data points within a first multiple of the recurrence period;
generating a second label using a second subset of the dataset having data points within a second multiple of the recurrence period, wherein the second subset includes the data points from the first subset within the first multiple of the recurrence period;
training a machine learning model using the first label and the second label;
receiving a set of transactions associated with an account and a merchant; and
generating, by the trained machine learning model, a predicted recurrence within the set of transactions, wherein generating the predicted recurrence further comprises:

determining a vector strength, a coverage, and a redundancy, wherein the vector strength, the coverage, and the redundancy are phase variables determined based on a mapping of transaction dates in a phase space associated with the set of transactions and characterizing a recurrence period within the set of transactions, and wherein the vector strength includes a first value reflecting a level of recurrence of the set of transactions within the recurrence period, the coverage includes a second value reflecting a number of recurrence periods that include no transactions from the set of transactions, and the redundancy includes a third value reflecting a number of recurrence periods that include at least one transaction from the set of transactions, wherein the set of transactions are plotted on the phase space for multiple recurrence periods with associated phase variables for each of the multiple recurrence periods and wherein the multiple recurrence periods includes the recurrence period; and generating a probability of the merchant having the predicted recurrence within the set of transactions for the account, for the recurrence period, using the trained machine learning model based on an evaluation of at least one of the first value, the second value and the third value.

15. The non-transitory computer-readable device of claim 14, wherein to generate the first label, the operations further comprise:

designating the first subset as an analysis portion;
designating the data points having a time value exceeding the first multiple of the recurrence period as a holdout portion; and
testing the holdout portion against the analysis portion to generate the first label.

16. The non-transitory computer-readable device of claim 15, the operations further comprising:

identifying a third multiple of the recurrence period; and
determining a holdout date by subtracting the third multiple from a data point of the dataset having a most recent time value.

17. The non-transitory computer-readable device of claim 16, the operations further comprising:

determining that a fourth multiple of the recurrence period exceeds the holdout date; and
in response to the determining, ceasing label generation.

18. The non-transitory computer-readable device of claim 14, wherein the second multiple of the recurrence period is incrementally selected relative to the first multiple of the recurrence period.

19. The non-transitory computer-readable device of claim 14, the operations further comprising:

determining a third multiple of the recurrence period; and
ceasing label generation in response to determining that no data points of the dataset have a time value between the second multiple of the recurrence period and the third multiple of the recurrence period.

20. The non-transitory computer-readable device of claim 14, the operations further comprising:

generating a third label using a third subset of the data having data points within a third multiple of the recurrence period, wherein the third subset includes the data points from the first subset and the data points from the second subset.

* * * * *